(12) United States Patent
Manthiram et al.

(10) Patent No.: US 8,288,025 B2
(45) Date of Patent: Oct. 16, 2012

(54) HIGH PERFORMANCE POLYMERIC BLEND MEMBRANE MATERIALS BASED ON N-HETEROCYCLES AND ACID-BASE INTERACTIONS

(75) Inventors: Arumugam Manthiram, Austin, TX (US); Yongzhu Fu, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 1274 days.

(21) Appl. No.: 11/779,821

(22) Filed: Jul. 18, 2007

(65) Prior Publication Data

US 2008/0020256 A1   Jan. 24, 2008

Related U.S. Application Data

(60) Provisional application No. 60/831,543, filed on Jul. 18, 2006.

(51) Int. Cl.
   *H01M 2/16* (2006.01)
(52) U.S. Cl. ............ 429/33; 429/314; 429/303; 521/27; 525/390
(58) Field of Classification Search .................. 429/33, 429/303, 314; 521/27; 525/390
   See application file for complete search history.

(56) References Cited

U.S. PATENT DOCUMENTS

| | | | |
|---|---|---|---|
| 5,599,639 A | 2/1997 | Sansone et al. | |
| 6,124,060 A | 9/2000 | Akita et al. | |
| 6,300,381 B1* | 10/2001 | Kerres et al. | 521/27 |
| 6,869,715 B2 | 3/2005 | Alvarez-Gallego et al. | |
| 6,936,365 B2 | 8/2005 | Hobson et al. | |
| 7,052,805 B2* | 5/2006 | Narang et al. | 429/314 |
| 2007/0072045 A1* | 3/2007 | Haufe et al. | 429/35 |

OTHER PUBLICATIONS

Persson, J. C., et al., "Intrinsically Proton-Conducting Benzimidazole Units Tethered to Polysiloxanes," Macromolecules (2005), 38:3283-3289.*
Lufrano, F., et al., "Sulfonated Polysulfone as Promising Membranes for Polymer Electrolyte Fuel Cells," J Appl Polym Sci (2000), 77:1250-1257.*
Li, Q., et al., "PBI-Based Polymer Membranes for High Temperature Fuel Cells—Preparation, Characterization and Fuel Cell Demonstration," Fuel Cells 4 147 (2004).*
Kreuer, K.D., et al., "Imidazole and pyrazole-based proton conducting polymers and liquids," Electrochim. Acta 43, 1281 (1998).*
Guiver, Michael D., et al., "Synthesis and Characterization of Carboxylated Polysulfones," British Polymer Journal 23 (1990) 29-39.*
Asano, N., et al. "Sulfonated Block Polyimide Copolymers as a Proton-Conductive Membrane," J Polym Sci Part A (2006), 44:2744-2748.

(Continued)

*Primary Examiner* — Peter D. Mulcahy
*Assistant Examiner* — Henry Hu
(74) *Attorney, Agent, or Firm* — Edwin S. Flores; Chainey P. Singleton; Chalker Flores, LLP

(57) ABSTRACT

The present invention includes method, compositions and devices including acid-base polymer membranes with high proton conductivity at low relative humidity, good thermal and mechanical stabilities and low methanol crossover. The acid-base polymer membrane includes an acidic polymer mixed with a basic polymer. The acidic polymer includes an acidic group attached to an aromatic polymer, while the basic polymer includes at least one heterocyclic ring structure attached to an aromatic polymer.

19 Claims, 11 Drawing Sheets

OTHER PUBLICATIONS

Asensio, J. A., et al., "Polymer Electrolyte Fuel Cells Based on Phosphoric Acid-Impregnated Poly(2,5-benzimidazole) Membranes," J Electrochem Soc (2004), 151:A304-A310.

Bouchet, R., et al., "Proton conduction in acid doped polybenzimidazole," Solid State Ionics (1999), 118:287-299.

Bouchet R., et al., "A thermodynamic approach to proton conductivity in acid-doped polybenzimidazole," Solid State Ionics (2001), 145:69-78.

Bozkurt, A., et al., "Proton conducting blends of poly(4-vinylimidazole) with phosphoric acid," Solid State Ionics (2001), 138:259-265.

Bozkurt, A., et al., "PAA/imidazol-based proton conducting polymer electrolytes," J Power Sources (2003), 123:126-131.

Fu, Y.-Z., et al., "Synthesis and characterization of sulfonated polysulfone membranes for direct methanol fuel cells," J Power Sources (2006), 157:222-225.

Glipa, X., et al., "Investigation of the conduction properties of phosphoric and sulfuric acid doped polybenzimidazole," J Mater Chem (1999), 9:3045-3049.

Heinzel, A., et al., "A review of the state-of-the-art of the methanol crossover in direct methanol fuel cells," J Power Sources (1999), 84:70-74.

Herz, H. G., et al., "New fully polymeric proton solvents with high proton mobility," Electrochimica Acta (2003), 48:2165-2171.

Jannasch, P., "Recent developments in high-temperature proton conducting polymer electrolyte membranes," Curr Op Coll Inter Sci (2003), 8:96-102.

Kerres, J. A., "Development of ionomer membranes for fuel cells," J Membr Sci (2001), 185:3-27.

Kerres, J. A., "Blended and Cross-Linked Ionomer Membranes for Application in Membrane Fuel Cells," Fuel Cells (2005), 5:230-247.

Kobayashi, T., et al., "Proton-conducting polymers derived from poly(ether-etherketone) and poly(4-phenoxybenzoy1-1,4-phenylene)," Solid State Ionics (1998), 106:219-225.

Kreuer, K. D., "On the development of proton conducting polymer membranes for hydrogen and methanol fuel cells," J Membr Sci (2001), 185:29-39.

Kreuer, K. D., et al., "Transport in Proton Conductors for Fuel-Cell Applications: Simulations, Elementary Reactions, and Phenomenology," Chem Rev (2004), 104:4637-4678.

Li, Q. et al., "The CO Poisoning Effect in PEMFCs Operational at Temperatures up to 200° C.," J Electrochem Soc (2003), 150:A1599-1605.

Liu, F., et al., "Low Crossover of Methanol and Water Through Thin Membranes in Direct Methanol Fuel Cells," J Electrochem Soc (2006), 153:A543-A553.

Munch, W. et al., "The diffusion mechanism of an excess proton in imidazole molecule chains: first results of an ab initio molecular dynamics study," Solid State Ionics (2001), 145:437-443.

Pu, H., et al., "Proton Conductivity of Acid Doped Styrene-Maleic Imide Copolymer With Benzimidazole Side Group," Macromol Chem Phys (2005), 206:263-267.

Ren, X., et al., "Methanol Transport Through Nafion Membranes: Electro-osmotic Drag Effects on Potential Step Measurements," J Electrochem Soc (2000), 147:466-474.

Schuster, M., et al., "Proton mobility in oligomer-bound proton solvents: imidazole immobilization via flexible spacers," Solid State Ionics (2001), 145:85-92.

Schuster, M., et al., "Toward a New Type of Anhydrous Organic Proton Conductor Based on Immobilized Imidazole," Chem Mater (2004), 16:329-337.

Sun, J., et al., "Acid-Organic base swollen polymer membranes," Electrochimica Acta (2001), 46:1703-1708.

Wasmus, S., et al., "Methanol oxidation and direct methanol fuel cells: a selective review," J Electroanal Chem (1999), 461:14-31.

Xiong, L., et al., "Pt—M (M¼Fe, Co, Ni and Cu) electrocatalysts synthesized by an aqueous route for proton exchange membrane fuel cells," Electrochem Comm (2002), 4:898-903.

Yamada, M., et al., "Anhydrous Protonic Conductivity of a Self-Assembled Acid-Base Composite Material," J Phys Chem B (2004), 108:5522-5526.

Yamada, M., et al., "Anhydrous proton conducting polymer electrolytes based on poly(vinylphosphonic acid)-heterocycle composite material," Polymer (2005), 46:2986-2992.

Yang, B., et al., "Sulfonated Poly(ether ether ketone) Membranes for Direct Methanol Fuel Cells," Electrochem Solid State Lett (2003), 6:A229-A231.

Yang, B., et al., "Comparison of the small angle X-ray scattering study of sulfonated poly(etheretherketone) and Nafion membranes for direct methanol fuel cells," J Power Sources (2006), 153:29-35.

Yang, C., et al., "Approaches and technical challenges to high temperature operation of proton exchange membrane fuel cells," J Power Sources (2001), 1003:1-9.

Yin, Y., et al., "On the Development of Naphthalene-Based Sulfonated Polyimide Membranes for Fuel Cell Applications," Polym J (2006), 38:197-219.

Zhou, Z., et al., "Promotion of Proton Conduction in Polymer Electrolyte Membranes by 1H-1,2,3-Triazole," J Am Chem Soc (2005), 127:10824-10825.

* cited by examiner

HIGH PERFORMANCE POLYMERIC BLEND MEMBRANE MATERIALS BASED ON N-HETEROCYCLES AND ACID-BASE INTERACTIONS

CROSS-REFERENCE TO RELATED APPLICATIONS

This application claims priority to U.S. Provisional Application Ser. No. 60/831,543, filed Jul. 18, 2006, the contents of which is incorporated by reference herein in its entirety.

TECHNICAL FIELD OF THE INVENTION

The present invention relates in general to the field of electrochemical fuel cells, and in particular, to improved polymeric membrane materials for use in proton exchange membrane fuel cells and direct methanol fuel cells.

BACKGROUND OF THE INVENTION

Without limiting the scope of the invention, its background is described in connection with electrochemical fuel cells, and in particular, to polymeric ionic-diffusion membrane for use in proton exchange membrane fuel cells (hereafter referred to as "PEMFC") and direct methanol fuel cells (hereafter referred to as "DMFC"). Generally, a fuel cell contains a membrane electrolyte disposed between two electrodes, e.g., a fuel electrode (anode) and an oxygen electrode (cathode). The electrolyte is often a proton conducting polymer membrane formed from a solid polymer. In operation, a fuel cell generates electricity through an oxidation reaction that produces proton and electrons at the anode. The electrons are transferred to the cathode through an external circuit, while the protons are transferred to the cathode through the polymer electrolyte membrane. The environment that the fuel cell is exposed to is harsh and must be able to withstand a wide range of temperatures, while exhibiting electrical and chemical stability. Basically, the fuel cell electrolyte membrane must maintain proton conductivity over a wide range of temperatures.

One common fuel cell electrolyte membrane material includes a perfluorosulfonic acid resin known by the trademark NAFION® which is a sulfonated tetrafluorethylene copolymer). The perfluorosulfonic acid resin is basically a proton exchange resin with sulfonic acid groups that when hydrated the $SO_3H$ of a resin branch dissociate to allow proton conductivity. However, at temperatures above 100° C. the ionic resistance of perfluorosulfonic acid resin increases as a result of evaporation of water; moisture allows the operation of PEMFC within the boiling point of water. The limited operating temperature (< about 100° C.) and the need for water to allow proton conduction not only necessitates complex external humidification systems but also leads to a poisoning of the platinum catalyst by trace amounts of carbon monoxide impurity present in the hydrogen fuel. The perfluorosulfonic acid membrane also allows a high permeation of the methanol fuel from the anode to the cathode, referred to as methanol crossover, resulting in a poisoning of the cathode catalyst and consequent performance loss in DMFC. Therefore, design and development of electrolyte membranes that can operate at high temperatures (>100° C.) and low relative humidity in PEMFC and with suppressed or low methanol permeability in DMFC can enhance the commercialization feasibility of the fuel technologies.

SUMMARY OF THE INVENTION

The present inventors recognized a need for a polymeric membrane that can operate at higher temperatures and low relative humidity (RH) to reduce the poisoning of the Pt catalyst, simplify or eliminate the external humidification subsystem in a fuel cell, and enhance the characteristics of the electrolyte in PEMFC and DMFC due to their high proton conductivity combined with good chemical and mechanical properties and low methanol permeability.

The present invention provides a novel aromatic polymer (e.g., polysulfone) bearing a nitrogen-containing heterocycle (e.g., benzimidazole, 2-amide-benzimidazole and so forth and referred to as N-heterocycle hereafter) side group. The present invention is different from the well known poly(benzimidazole) (PBI) polymer, and it has the benzimidazole units or 2-amide-benzimidazole units attached to the main chain. Blend membranes fabricated with sulfonated poly (ether ether ketone) (SPEEK) and poly(sulfone) (PSf) bearing benzimidazole side group and/or 2-amide-benzimidazole side group exhibit higher proton conductivity and better performance in PEMFC at about 90° C. and about 100° C. compared to the plain SPEEK or NAFION® membranes. The polymers bearing benzimidazole or 2-amide-benzimidazole side groups may be used to create membranes that operate at higher temperatures (> about 100° C.) and low relative humidity in PEMFC and with low methanol crossover in DMFC.

For example, the present invention includes an acid-base polymer membrane having an acidic polymer mixed with a basic polymer. The acidic polymer includes an acidic group attached to an aromatic polymer. The acidic group may be a sulfonic acid group, a phosphonic acid group, or any other acidic group known to the skilled artisan. The basic polymer includes at least one heterocyclic ring structure (N-heterocycle) attached to an aromatic polymer. The acid-base polymer membrane has high proton conductivity at low relative humidity, good thermal and mechanical stabilities, and low methanol crossover.

The present invention also includes a method of making a polymer membrane by mixing an acidic polymer based on poly(ether ether ketone) with a basic polymer having one or more heterocyclic ring structure attached to an aromatic polymer and forming the mixed acidic polymer and basic polymer into a membrane.

A fuel cell is also provided by the present invention. The fuel cell includes one or more catalyst layers, a gas-diffusion layer and a polymeric membrane. The polymeric membrane includes an acidic polymer with an acidic group attached to an aromatic polymer. The acidic group may be sulfonic acid group, phosphonic acid group or any other acidic group known to the skilled artisan. The basic polymer includes at least one heterocyclic ring structure attached to an aromatic polymer. The acid-base polymer membrane has high proton conductivity at low relative humidity, good thermal and mechanical stabilities, and low methanol permeability.

The present invention provides an acid-base polymer nanomembrane having an acidic polymer comprising a poly(etheretherketone) mixed with a basic polymer. The basic polymer includes at least one heterocyclic ring structure attached to an aromatic polymer. The acid-base polymer polymer nanomembrane has proton conductivity, thermal stability and low relative humidity.

The present invention also provides a method of making a polymer nanomembrane by mixing and/or blending an acidic polymer comprising a poly(ether ether ketone) with a basic polymer having one or more heterocyclic ring structure attached to an aromatic polymer and forming the mixed acidic polymer and basic polymer into a membrane. In some instances the basic polymer has a degree of substitution of the at least one heterocyclic rings of between about 0.9 and about 2.1 per repeat unit.

Also provided is a membrane-electrode assembly for use in a PEMFC or DMFC. The membrane includes an acidic polymer comprising an aromatic polymer having sulfonated poly (ether ether ketone) or sulfonated poly(sulfone) mixed with a basic polymer having at least one heterocyclic ring structure attached to an aromatic polymer having poly(ether ether ketone) and poly(sulfone). The membrane has high proton conductivity at low relative humidity, good thermal and mechanical stabilities, and low methanol permeability.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
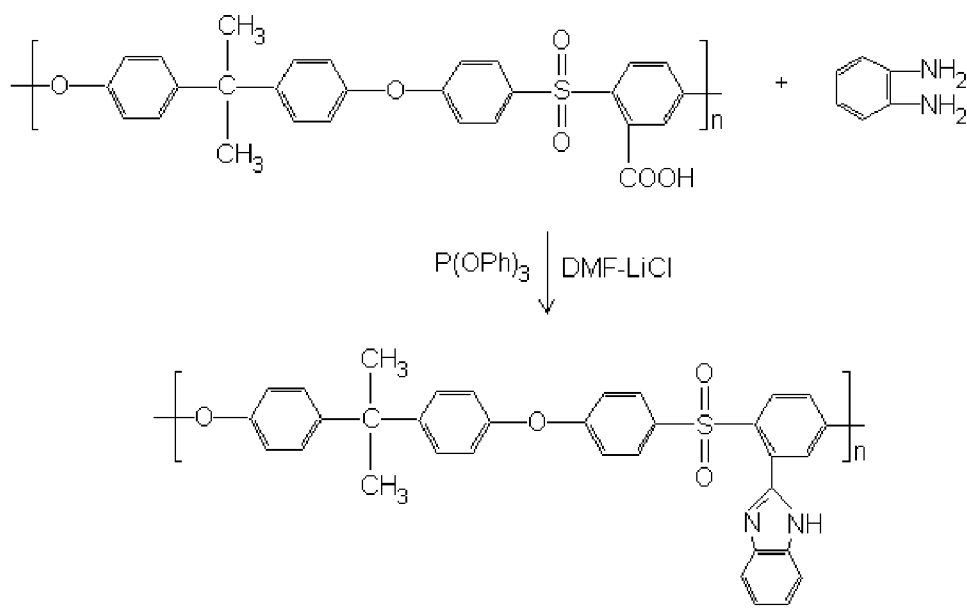
FIG. 1 is a diagram that indicates the synthesis of polysulfone bearing benzimidazole side group.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "alkyl" denotes branched or unbranched hydrocarbon chains, preferably having about 1 to about 10 carbons, such as, methyl, ethyl, n-propyl, iso-propyl, n-butyl, sec-butyl, iso-butyl, tert-butyl, octa-decyl and 2-methylpentyl. These groups can be optionally substituted with one or more functional groups which are attached commonly to such chains, such as, hydroxyl, bromo, fluoro, chloro, iodo, mercapto or thio, cyano, alkylthio, heterocyclyl, aryl, heteroaryl, carboxyl, carbalkoyl, alkyl, alkenyl, nitro, amino, alkoxyl, amido, and the like to form alkyl groups such as trifluoro methyl, 3-hydroxyhexyl, 2-carboxypropyl, 2-fluoroethyl, carboxymethyl, cyanobutyl and the like. Examples of alkyl groups include; methyl, ethyl, n-propyl, isopropyl, n-butyl, isobutyl, sec-butyl, tert-butyl, n-pentyl, isopentyl, sec-pentyl, neopentyl, 1,2-dimethylpropyl, n-hexyl, iso-hexyl, sec-hexyl, n-heptyl, isoheptyl, n-octyl, isooctyl, 2-ethylhexyl, n-decyl, 2-n-propyl-n-heptyl, n-tridecyl, 2-n-butyl-n-nonyl and 3-n-butyl-n-nonyl, particularly preferably ethyl, isopropyl, 2-ethylhexyl, n-decyl, 2-n-propyl-n-heptyl, n-tridecyl, 2-n-butyl-n-nonyl and 3-n-butyl-n-nonyl, and C40-C200-alkyl such as polybutyl, polyisobutyl, polypropyl, polyisopropyl and polyethyl.

The term "alkylene" refers to a divalent alkyl group as defined above, such as methylene (—$CH_2$—), propylene (—$CH_2CH_2CH_2$—), chloroethylene (—$CHClCH_2$—), 2-thiobutene —CH$_2$CH(SH)CH$_2$CH$_2$, 1-bromo-3-hydroxyl-4-methylpentene (—CHBrCH$_2$CH(OH)CH(CH$_3$)CH$_2$—), and the like.

As used herein, the term "Alkenyl" denotes optionally substituted straight chain and branched hydrocarbon radicals having about 1 to about 10 carbons with at least one carbon-carbon double bond. Alkenyls include ethenyl (or vinyl), prop-1-enyl, prop-2-enyl (or allyl), isopropenyl (or 1-methylvinyl), but-1-enyl, but-2-enyl, butadienyls, pentenyls, hexa-2,4-dienyl, styryl and so on. Hydrocarbon radicals having a mixture of double bonds and triple bonds, such as 2-penten-4-ynyl, are grouped herein. Alkenyl includes cycloalkenyl. Both the Cis and trans (or (E) and (Z)) forms are included within the invention.

The term "alkynyl" refers to branched or unbranched hydrocarbon chains containing one or more carbon-carbon triple bonds.

As used herein, the term "aryl" denotes a chain of carbon atoms which form at least one aromatic ring having between about 4-14 carbon atoms, such as phenyl, naphthyl, and the like, and which may be substituted with one or more functional groups which are attached commonly to such chains, such as hydroxyl, bromo, fluoro, chloro, iodo, mercapto or thio, cyano, cyanoamido, alkylthio, heterocycle, aryl, heteroaryl, carboxyl, carbalkoyl, alkyl, alkenyl, nitro, amino, alkoxyl, amido, and the like to form aryl groups such as biphenyl, iodobiphenyl, methoxybiphenyl, anthryl, bromophenyl, iodophenyl, chlorophenyl, hydroxyphenyl, methoxyphenyl, formylphenyl, acetylphenyl, trifluoromethylthiophenyl, trifluoromethoxyphenyl, alkylthiophenyl, trialkylammoniumphenyl, amidophenyl, thiazolylphenyl, oxazolylphenyl, imidazolylphenyl, imidazolylmethylphenyl, and the like.

The term "alkoxy" denotes —OR—, wherein R is alkyl ether group and includes an optionally substituted straight chain or branched alkyl group having about 1 to about 20 carbons with a terminal oxygen linking the alkyl group to the rest of the molecule. Alkoxy includes methoxy, ethoxy, propoxy, isopropoxy, butoxy, t-butoxy, pentoxy and so on. "Aminoalkyl", "thioalkyl", and "sulfonylalkyl" are analogous to alkoxy, replacing the terminal oxygen atom of alkoxy with, respectively, NH (or NR), S, and SO$_2$. Heteroalkyl includes alkoxy, aminoalkyl, thioalkyl, and so on. Examples of alkoxyalkyl groups include C2-C10-alkoxyalkyl, and include methoxymethyl, ethoxymethyl, n-propoxymethyl, isopropoxymethyl, n-butoxymethyl, isobutoxymethyl, sec-butoxymethyl, tert-butoxymethyl, 1-methoxyethyl, 2-methoxyethyl, alkoxyalkyl, methoxymethyl, ethoxymethyl, n-propoxymethyl, isopropoxymethyl, n-butoxymethyl, isobutoxymethyl, sec-butoxymethyl, tert-butoxymethyl, 1-methoxyethyl and 2-methoxyethyl.

The term "alkylcarbonyl" denote an alkyl group as defined above substituted with a C(O) group, for example, CH$_3$C(O)—, CH$_3$CH$_2$C(O)—, etc.

As used herein, the term "alkylcarboxyl" denote an alkyl group as defined above substituted with a C(O)O group, for example, CH$_3$C(O)O—, CH$_3$CH$_2$C(O)O—, etc.

As used herein, the term "amido" denotes an amide linkage: —C(O)NHR (wherein R is hydrogen or alkyl). The term "amino" denotes an amine linkage: —NR—, wherein R is hydrogen or alkyl.

The term "carbocycle" means a cyclic hydrocarbon chain having about 5 to about 8 ring carbons such as cyclopentyl, cyclohexyl, etc. These groups can be optionally substituted with one or more functional groups as defined under "alkyl" above.

As used herein, the term "carboxyl" denotes —C(O)O—, and the term "carbonyl" denotes —C(O)—. The term "cycloalkyl" signifies a saturated, cyclic hydrocarbon group with 3-8 carbon atoms, i.e. cyclopropyl, cyclobutyl, cyclopentyl and cyclohexyl and the like.

The term "halogen" includes chlorine, fluorine, bromine, iodine and mixtures thereof.

The term "heteroaryl" refers to an aromatic mono- or bicyclic radical having 5 to 10, e.g., 5 or 6 ring atoms, containing one to three heteroatoms, commonly one heteroatom, e.g. independently selected from nitrogen, oxygen or sulfur. Examples of heteroaryl groups are thiophenyl, isoxazolyl, thiazolyl, piperidinyl, pyridinyl, pyrrolyl, imidazolyl, tetrazolyl, preferably pyridinyl, isoxazolyl or thiazolyl. Optionally, the heteroaryl group can be mono-, di- or tri-substituted, independently, with phenyl, alkyl, alkylcarbonyl, alkoxycarbonyl, hydroxy, amino, alkylamino, dialkylamino, carboxy, alkoxycarbonylalkyl, preferably alkyl.

As used herein, the term "Heterocyclyl" denotes optionally substituted aromatic and nonaromatic rings having carbon atoms and at least one heteroatom (O, S, N) or heteroatom moiety (SO$_2$, CO, CONH, COO) in the ring. A heterocyclic radical may have a valence connecting it to the rest of the molecule through a carbon atom, such as 3-furyl or 2-imidazolyl, or through a heteroatom, such as N-piperidyl or 1-pyrazolyl. Heterocyclyl also includes fused, e.g., bicyclic, rings, such as those optionally condensed with an optionally substituted carbocyclic or heterocyclic five- or six-membered aromatic ring. For example, "heteroaryl" includes an optionally substituted six-membered heteroaromatic ring containing 1, 2 or 3 nitrogen atoms condensed with an optionally substituted six-membered carbocyclic or heterocyclic aromatic ring. Examples include thiazoylyl, furyl, pyranyl, isobenzofuranyl, pyrrolyl, imidazolyl, pyrazolyl, isothiazolyl, isoxazolyl, pyridyl, pyrazinyl, pyrimidinyl, pyridazinyl, indolizinyl, isoindolyl, indolyl, indazolyl, purinyl, quinolyl, furazanyl, pyrrolidinyl, pyrrolinyl, imdazolidinyl, imidazolinyl, pyrazolidinyl, pyrazolinyl, piperidyl, piperazinyl, indolinyl, and morpholinyl.

As used herein, the term "optional" and "optionally" denotes that the subsequently described event or circumstance may or may not occur. As used herein the term "optionally substituted" refers to the possibility of one or more groups being substituted, bound, or otherwise associated with composition. Such substitutions include "alkyl" groups branched or unbranched hydrocarbon chains, preferably having about 1 to about 10 carbons; "Alkenyl" groups themselves optionally substituted straight chain and branched hydrocarbon radicals having about 1 to about 10 carbons with at least one carbon-carbon double bond; "aryl" groups a chain of carbon atoms which form a ring system with at least one aromatic ring having between about 4-14 carbon atoms; "Alkoxy" groups an alkyl ether group and includes an optionally substituted straight chain or branched alkyl group having about 1 to about 20 carbons with a terminal oxygen linking the alkyl group to the rest of the molecule; "Heterocyclyl" groups optionally substituted aromatic and nonaromatic rings having carbon atoms and at least one heteroatom (O, S, N) or heteroatom moiety (SO$_2$, CO, CONH, COO) in the ring; "Acyl" groups to a carbonyl moiety attached to either a hydrogen atom (i.e., a formyl group) or to an optionally substituted alkyl or alkenyl chain, or heterocyclyl; and "Aroyl" groups to a carbonyl moiety attached to an optionally substituted aryl or heteroaryl group, wherein aryl and heteroaryl have the definitions provided above. It will be understood by those skilled in the art with respect to any group containing one or more substituents that such groups are not intended to introduce any substitution or substitution patterns that are sterically impractical and/or synthetically non-feasible.

As used herein, the term "haloalkanes" or "haloalkyl" denotes a group of chemical compounds, consisting of alkanes, such as methane or ethane, with one or more halogens linked, such as chlorine or fluorine, making them an organic halide.

Examples of the substituent group include a halogen atom, hydroxyl cyano, nitro, carboxyl, an alkyl group, an alkenyl group, an aryl group, an alkoxy group, an alkenyloxy group, an aryloxy group, an acyloxy group, an alkoxycarbonyl group, an alkenylcarbonyl group, an aryloxycarbonyl group, sulfamoyl, an alkyl-substituted sulfamoyl group, an alkenyl-substituted sulfamoyl group, an aryl-substituted sulfamoyl group, a sulfonamido group, carbamoyl, an alkyl-substituted carbamoyl group, an alkenyl-substituted carbamoyl group, an aryl-substituted carbamoyl group, an amido group, an alkylthio group, an alkenylthio group, an arylthio group and an acyl group. For example, one or more functional groups may be attached such as hydroxyl, bromo, fluoro, chloro, iodo, mercapto or thio, cyano, cyanoamido, alkylthio, heterocycle, aryl, heteroaryl, carboxyl, carbalkoyl, alkyl, alkenyl, nitro, amino, alkoxyl, amido, and the like to form aryl groups such as biphenyl, iodobiphenyl, methoxybiphenyl, anthryl, bromophenyl, iodophenyl, chlorophenyl, hydroxyphenyl, methoxyphenyl, formylphenyl, acetylphenyl, trifluoromethylthiophenyl, trifluoromethoxyphenyl, alkylthiophenyl, trialkylammoniumphenyl, amidophenyl, thiazolylphenyl, oxazolylphenyl, imidazolylphenyl, imidazolylmethylphenyl, and the like. Examples of aromatic groups include; phenyl, 1-naphthyl, 2-naphthyl, 1-anthryl, 2-anthryl and 9-anthryl, 1-phenanthryl, 2-phenanthryl, 3-phenanthryl, 4-phenanthryl and 9-phenanthryl.

Examples of alkylaryl include alkyl aromatic groups, 2-nonylphenyl, 3-nonlyphenyl, 4-nonylphenyl, 2-decylphenyl, 3-decylphenyl, 4-decylphenyl, 2,3-dinonylphenyl, 2,4-dinonylphenyl, 2,5-dinonylphenyl, 3,4-dinonylphenyl, 3,5-dinonylphenyl, 2,3-didecylphenyl, 2,4-didecylphenyl, 2,5-didecylphenyl, 3,4-didecylphenyl and 3,5-didecylphenyl, 2-methylphenyl, 3-methylphenyl, 4-methylphenyl, 2,4-dimethylphenyl, 2,5-dimethylphenyl, 2,6-dimethylphenyl, 3,4-dimethylphenyl, 3,5-dimethylphenyl, 2,3,4-trimethylphenyl, 2,3,5-trimethylphenyl, 2,3,6-trimethylphenyl, 2,4,6-trimethylphenyl, 2-ethylphenyl, 3-ethylphenyl, 4-ethylphenyl, 2-n-propylphenyl, 3-n-propylphenyl and 4-n-propylphenyl.

The present invention provides an acid-base polymer membrane having a mixture of an acidic polymer and a basic polymer. The acidic polymer includes an acidic group attached to an aromatic polymer. The acidic group may be sulfonic acid group, phosphonic acid group or any other acidic group known to the skilled artisan. The basic polymer includes at least one heterocyclic ring structure attached to an aromatic polymer. The acid-base polymer membrane has high proton conductivity at low relative humidity, good thermal and mechanical stabilities, and low methanol crossover.

Commonly the acidic polymer includes a sulfonated poly (ether ether ketone) and the basic polymer includes a poly (sulfone); however, other polymers, mixtures of polymers and combinations of polymers may be used. For example, the heterocyclic ring structure may be pyrrole, indole, isoindole, imidazole, benzimidazole, purine, pyrazole, indazole, oxazole, benzoxazole, isoxazole, benzisoxazole, thiazole, benzothiazole, pyridine, quinoline, isoquinoline, pyrazine, quinoxaline, acridine, pyrimidine, quinazoline, pyridazine, cinnoline, triazole or combinations thereof. In addition, the polymers and/or heterocyclic ring structure may be substituted with one or more groups or atoms. The number, position, location, modification and type of heterocyclic ring may be varied by the skilled artisan.

The modifications may include the addition of one or more of the following groups: lower alkyl, alkoxy, alkoxyalkyl, hydroxy, hydroxyalkyl, alkenyl, amino, nitrate, alkylamino, dialkylamino, nitro, nitroso, aryl, alkylaryl, arylalkoxy, cycloalkyl, bridged cycloalkyl, cycloalkoxy, arylthio, alkylsulfinyl, caboxamido, carbamoyl, carboxyl, carbonyl, halogen, halo, haloalkyl, haloalkoxy, heteroayl, heterocyclic ring, arylheterocyclic ring, heterocyclic compounds, amido, alkylamido, carboxylic ester, carboxylic acid, phosphoryl or combination thereof. In addition, the modification may be similarly modified with one or more lower alkyl, alkoxy, alkoxyalkyl, hydroxy, hydroxyalkyl, alkenyl, amino, nitrate, alkylamino, dialkylamino, nitro, nitroso, aryl, alkylaryl, arylalkoxy, cycloalkyl, bridged cycloalkyl, cycloalkoxy, arylthio, alkylsulfinyl, caboxamido, carbamoyl, carboxyl, carbonyl, halogen, halo, haloalkyl, haloalkoxy, heteroayl, heterocyclic ring, arylheterocyclic ring, heterocyclic compounds, amido, alkylamido, carboxylic ester, carboxylic acid, phosphoryl or combination thereof.

As used herein, the term "high proton conductivity" refers to a proton conductivity of greater than about $10^{-4}$ S/cm. As used herein, the term "low relative humidity" refers to low relative humidity conditions in the range of about 0 to 30 relative humidity (RH).

The term "good thermal stability" and "thermal stability" refers to the thermal stability of the membrane and is used to denote that the membrane does not substantially degrade over an extended period of time under operating conditions in a fuel cell environment (e.g., up to about 150° C.).

The term "mechanical stability" and "good mechanical stability" refers to the physical characteristics of the polymer membrane and generally include flexibility with certain strength to hold the pressure difference between the anode and cathode and stable in the fuel cell operating environment without substantial mechanical degradation.

The term "low methanol permeability" refers to the amount of methanol that crosses the membrane from the anode to the cathode. The term "low methanol permeability" refers to the transfer of methanol through the membrane in a concentration that is lower than that found with the conventional NAFION® membrane with the same membrane thickness.

Unless otherwise specified, as used herein the abbreviation include: SPEEK refers to sulfonated poly(ether ether ketone) and optionally substituted sulfonated poly(ether ether ketone); PEEK refers to poly(ether ether ketone) and optionally substituted poly(ether ether ketone; PSf-BIm refers to polysulfone bearing benzimidazole side group and optionally substituted polysulfone bearing benzimidazole side groups; and CPSf refers to carboxylated polysulfone and optionally substituted carboxylated polysulfones.

A method of making a polymer membrane by combining an acidic polymer and a basic polymer is provided by the present invention. The acidic polymer includes one or more acidic group attached to an aromatic polymer or tethered to the polymer. The basic polymer includes at least one heterocyclic ring structure attached to an aromatic polymer. The acid-base polymer membrane has high proton conductivity at low relative humidity, good thermal and mechanical stabilities, and low methanol permeability.

The present invention provides a method of making a polymer electrolyte fuel cell. The polymer electrolyte fuel cell includes a pair of electrodes separated by a polymer electrolyte membrane. The polymer electrolyte membrane includes an acidic polymer blended with a basic polymer. The acidic polymer includes an acidic group attached to an aromatic polymer. The acidic group may be sulfonic acid group, phosphonic acid group or any other acidic group known to the skilled artisan. The basic polymer includes at least one heterocyclic ring structure attached to an aromatic polymer. The acid-base polymer membrane has high proton conductivity at low relative humidity, good thermal and mechanical stabilities, and low methanol crossover.

The present invention provides an acid-base polymer nanomembrane having an acidic polymer comprising a poly(etheretherketone) mixed with a basic polymer. The basic polymer includes at least one heterocyclic ring structure attached to an aromatic polymer. The acid-base polymer polymer nanomembrane has proton conductivity, thermal stability and low relative humidity.

The acidic polymer may be a sulfonated poly(ether ether ketone) and the basic polymer comprises a poly(sulfone). The heterocyclic ring may be pyrrole, indole, isoindole, imidazole, benzimidazole, purine, pyrazole, indazole, oxazole, benzoxazole, isoxazole, benzisoxazole, thiazole, benzothiazole, pyridine, quinoline, isoquinoline, pyrazine, quinoxaline, acridine, pyrimidine, quinazoline, pyridazine, cinnoline or combinations thereof. The heterocyclic ring structure may include one or more benzimidazole groups, imino-benzimidazole group, amide-benzimidazole group or mixtures and combinations thereof, e.g., benzimidazole, 2-amide-benzimidazole. The basic polymer has a degree of substitution of the at least one heterocyclic rings of between about 0.9 and about 2.1 per repeat unit.

The compositions of the present invention may be substituted with one or more substitutions to the at least one heterocyclic ring structure, wherein the one or more substitutions are selected from lower alkyl, alkoxy, alkoxyalkyl, hydroxy, hydroxyalkyl, alkenyl, amino, nitrate, alkylamino, dialkylamino, nitro, nitroso, aryl, alkylaryl, arylalkoxy, cycloalkyl, bridged cycloalkyl, cycloalkoxy, arylthio, alkylsulfinyl, caboxamido, carbamoyl, carboxyl, carbonyl, halogen, halo, haloalkyl, haloalkoxy, heteroayl, heterocyclic ring, arylheterocyclic ring, heterocyclic compounds, amido, alkylamido, carboxylic ester, carboxylic acid, phosphoryl or combination thereof. In addition, the modification may be similarly modified with one or more lower alkyl, alkoxy, alkoxyalkyl, hydroxy, hydroxyalkyl, alkenyl, amino, nitrate, alkylamino, dialkylamino, nitro, nitroso, aryl, alkylaryl, arylalkoxy, cycloalkyl, bridged cycloalkyl, cycloalkoxy, arylthio, alkylsulfinyl, caboxamido, carbamoyl, carboxyl, carbonyl, halogen, halo, haloalkyl, haloalkoxy, heteroayl, heterocyclic ring, arylheterocyclic ring, heterocyclic compounds, amido, alkylamido, carboxylic ester, carboxylic acid, phosphoryl or combination thereof.

The present invention also provides a method of making a polymer nanomembrane by mixing and/or blending an acidic polymer comprising a poly(ether ether ketone) with a basic polymer having one or more heterocyclic ring structure attached to an aromatic polymer and forming the mixed acidic polymer and basic polymer into a membrane. In some instances the basic polymer has a degree of substitution of the at least one heterocyclic rings of between about 0.9 and about 2.1 per repeat unit. The acidic polymer may be a sulfonated poly(ether ether ketone) and basic polymer comprises a polysulfone polymer. The heterocyclic ring includes pyrrole, indole, isoindole, imidazole, benzimidazole, purine, pyrazole, indazole, oxazole, benzoxazole, isoxazole, benzisoxazole, thiazole, benzothiazole, pyridine, quinoline, isoquinoline, pyrazine, quinoxaline, acridine, pyrimidine, quinazoline, pyridazine, cinnoline or combinations thereof.

In addition the present invention includes a fuel cell having area with a pair of sandwiching polymer electrolyte membrane therebetween, thereby forming a polymer electrolyte membrane-electrode assembly and two or more gas diffusion electrodes catalyst layers separated by an ion conductive polymer electrolyte membrane with an acidic polymer comprising a poly(etheretherketone) mixed with a basic polymer with at least one heterocyclic ring structure attached to an aromatic polymer, wherein the gas-diffusion layer has proton conductivity, thermal stability and low relative humidity.

A gas-diffusion membrane for use in an exchange membrane fuel cell is also provided. The membrane includes a gas-diffusion layer having an acidic polymer with an acidic polymer comprising a poly(etheretherketone) mixed with a basic polymer having at least one heterocyclic ring structure attached to an aromatic polymer, wherein the gas-diffusion layer has proton conductivity, thermal stability and low relative humidity. In some instances the present invention may include an anode and the cathode are combined by hot-pressing.

Direct methanol fuel cells (DMFC), employing liquid methanol as a fuel, offer an attractive option to replace lithium ion batteries in portable devices, eliminating the necessity of electrical outlet (1, 2). The use of a liquid fuel also makes DMFC attractive for transportation applications, overcoming the difficulties related to safe and economical production, storage, and transportation of hydrogen fuel and the associated infrastructure issues. However, the high electro-osmotic drag coefficient of the currently used proton conducting electrolyte membrane NAFION® (a fluorinated polymer) results in a high methanol crossover from the anode to the cathode through the membrane and a consequent performance loss in DMFC (3, 4).

Currently, polymers (e.g., NAFION®, a sulfonated tetrafluorethylene copolymer commercial product of Du Pont) are used as the electrolyte in proton exchange membrane fuel cells (PEMFC) and DMFC due to their high proton conductivity combined with good chemical and mechanical properties. However, the proton conduction in NAFION® occurs only under wet conditions (e.g., vehicle-type mechanism), which limits the operating temperatures to at or below about 100° C. and necessitates complex external humidification systems. In addition, the low operating temperature leads to a poisoning of the Pt catalyst by trace amounts of CO impurity present in the fuel (5), necessitating expensive fuel cleanup processes to bring down the CO impurity level to a few ppm.

Several non-fluorinated polymeric materials have been investigated as replacements for NAFION® due to low cost and ease of synthesis (6-9), but they are generally based on free sulfonic acid groups and experience severe dimensional swelling in DMFC at high degree of sulfonation, resulting in mechanical instability problems (1, 10, 11). Blended or cross-linked ionomers have been pursued to overcome this problem, but they usually lead to a sacrifice in fuel cell performance (12, 13).

The present invention provides polymeric membranes that can operate at higher temperatures and low relative humidity (RH) and can suppress or eliminate these problems and enhance the commercialization prospects of the PEMFC technology for automotive applications. For example, complexes of poly(benzimidazole) (PBI) and phosphoric acid, introduced by Wainright et al., are known to be good candidates for high temperature PEMFC (14). An acid-base complex occurs between the nonprotonated, basic nitrogen of the PBI repeat unit and the absorbed phosphoric acid (15). The protons transfer between the nitrogen of benzimidazole and phosphoric acid by forming benzimidazolium cation and dihydrogenphosphate anion (16, 17), facilitating proton conduction by a Grotthuss-type mechanism, unlike the vehicle-type mechanism in NAFION®.

Similar complexed systems have also been pursued by replacing water by heterocycles as proton solvents; however, the problems of catalyst poisoning and operation temperature were not remedied (18-23). For example, high proton conductivity could be achieved by replacing water by imidazole in NAFION® (18), but its performance in fuel cell is poor due to the poisoning effect of imidazole on the platinum catalyst (20-22). Some nitrogen containing heterocycles (e.g. imidazole) attached to small, fixed chains have also been studied, but no fuel cell data are available (15, 24-27). In addition, efforts have been made to tether heterocycles like imidazole, 1H-1,2,3-triazole, and benzimidazole to alkyl polymer chains (28-32), but they are not ideal for high temperature PEMFC due to the low proton conductivity and poor stabilities of the alkyl backbones.

Tethering of N-heterocycles to an aromatic polymer network is a promising strategy to achieve high proton conductivity at high temperatures, involving a Grotthuss-type mechanism without requiring water, while preserving good chemical and mechanical stabilities at higher temperatures. Although imidazole is a good proton solvent, it is difficult to achieve good proton conductivity after tethering imidazole to a polymer since it has a higher $pK_a$ value 7.0. On the other hand, benzimidazole with a lower $pK_a$ value of 5.5 has a possibility of offering higher proton conductivity after tethering to a polymer network. Moreover, carboxylic acid groups attached to some aromatic polymers like polysulfone (33) can be easily transformed to benzimidazole units through condensation reactions.

The present invention provides a method and composition having a benzimidazole group attached to an aromatic polymer like poly(sulfone), which exhibits good stability and local mobility. The aromatic polymer with the tethered benzimidazole groups (basic polymer) is then blended with an acid polymer like sulfonated poly(ether ether ketone) (SPEEK) to obtain high proton conductivity through acid-base interactions. The synthesis, characterization, and evaluation in PEMFC of such blend membranes are presented here.

The polysulfone bearing benzimidazole side group (PSf-BIm) was synthesized starting from carboxylated polysulfone (CPSf). The details of the synthesis of CPSf having different degrees of carboxylation per repeat unit are available elsewhere (33). In one embodiment, the degree of carboxylation of CPSf was about 1.03, 1.58, and 1.90. The PSf-BIm prepared with them are hereafter designated as, respectively, PSf-BIm-103, PSf-BIm-158 and PSf-BIm-190. For PSf-BIm-103, 0.5 grams of CPSf and 0.1296 grams of 1,2-diaminobenzene were dissolved in 20 mL of dimethylformamide (DMF) in a three-necked flask, followed by an addition of 1.0 gram of lithium chloride and 2.86 mL of triphenylphosphite (TPP) into the flask. The solution was stirred at about 100° C. for about 3 hours and then at about 150° C. for about 10 hours under nitrogen atmosphere and poured into about 1000 mL of methanol to precipitate the polymer. The precipitate was collected by filtration and dried in a vacuum oven at about 110° C. overnight. The details of preparation of SPEEK are available elsewhere (34), and one example includes SPEEK with an ion exchange capacity (IEC) of between about 1.0 and 2.0 meq/g (e.g., 1.63 or 1.52 meq/g) and a degree of sulfonation (DS) of between about 40 and 60 percent (e.g., 51% or 54%). The SPEEK/PSf-BIm (3:1 weight ratio) blend membrane was prepared by a casting method employing a dimethylacetamide (DMAc) solution.

FT-IR and Proton Conductivity: The structure of the synthesized PSf-BIm was characterized with infrared spectroscopy using a Nicolet FT-IR instrument in the range of 4000 to 400 $cm^{-1}$. Proton conductivity values of the membranes were obtained from the impedance data, which were collected with a computer interfaced HP 4192A LF Impedance Analyzer in the frequency range of about 5 Hz to about 13 MHz with an applied voltage of about 10 mV. The impedance measurement was carried out using a home-made two-electrode setup and stainless steel was used as the blocking electrodes.

Membrane-Electrode Assembly (MEA) Fabrication and Fuel Cell Evaluation: The fuel cell electrodes consist of gas-diffusion and catalyst layers, and the details of their preparations are described elsewhere (35). The Pt metal loadings for the anode and cathode were both 0.4 $mg/cm^2$. The fuel cell performances were evaluated with a commercial fuel cell test system (Compucell GT, Electrochem. Inc.) using a single-cell fixture having an active area of 5 $cm^2$ and by feeding humidified hydrogen (about 80° C.) and oxygen (about 80° C.) into the anode and cathode, respectively, at a flow rate of about 50 and 100 mL/min with back pressures of about 10 and 12 psi.

Condensation reaction between 1,2-diaminobenzene and carboxylic acid is a universal method to synthesize benzimidazole unit. Carboxylated polysulfone was first synthesized as reported by Guiver et al. (33). The degree of carboxylation (DC) per repeat unit could be varied from about 0.2 to 1.9, which provides the flexibility to convert the carboxylic acid groups to benzimidazole side groups over a wide range.

FIG. 1 is a diagram that indicates the synthesis of polysulfone bearing benzimidazole side group by a reaction between carboxylated polysulfone and 1,2-diaminobenzene using triphenylphosphite (TPP) as a dehydration agent. To avoid the formation of the amide structure by cross-linking, the reaction was first carried out at a lower temperature of about 100° C. for about 3 hours to form a single C—N bond between the carboxylic acid group and one amino group of 1,2-diaminobenzene, followed by heating at about 150° C. for about 10 hours to form the C=N bond between the carboxylic carbon atom and the other amino group of 1,2-diaminobenzene. Lithium chloride was used to enhance the dissolution of the product in DMF.

Figure 2:
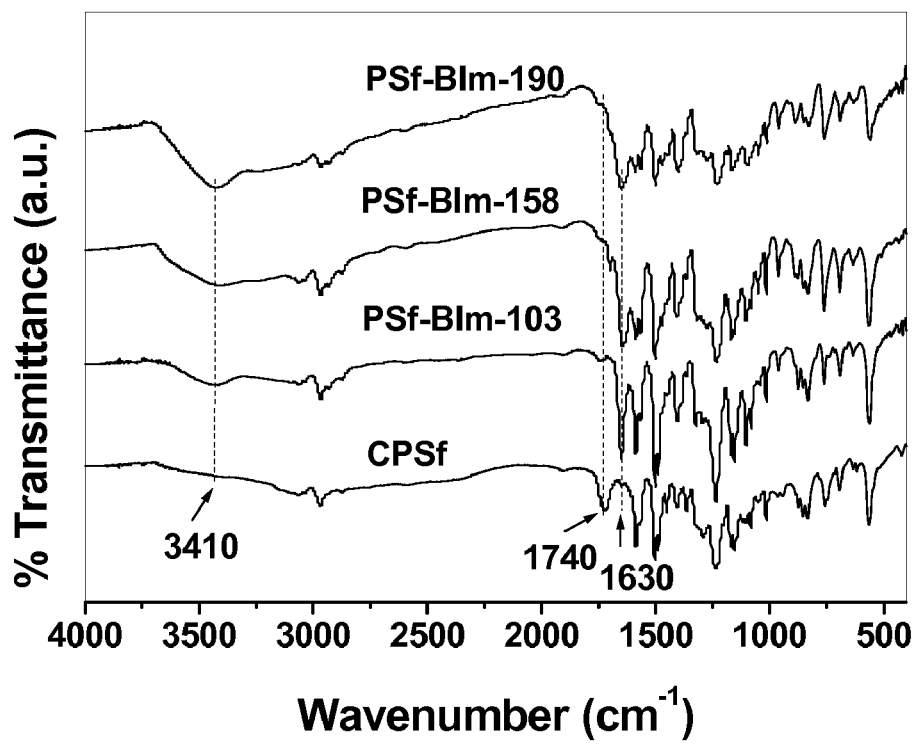
FIG. 2 is a graph that illustrates the FT-IR spectra of carboxylated polysulfone (CPSf), PSf-BIm-103, PSf-BIm-158, and PSf-BIm-190.

FIG. 2 is a graph that illustrates the FT-IR spectra of carboxylated polysulfone (CPSf), PSf-BIm-103, PSf-BIm-158, and PSf-BIm-190. The main absorption bands of PSf-BIm indicating the presence of benzimidazole are closely similar to those of PBI or poly(2,5-benzimidazole) (ABPBI) (36). The bands around 3400 $cm^{-1}$ in PSf-BIm are attributed to the isolated N—H stretching. The strong absorption at 1740 $cm^{-1}$ due to the C=O asymmetric stretching in CPSf almost disappeared in PSf-BIm, indicating the conversion of almost all of the carboxylic acid groups into benzimidazole groups. The product after about 3 hours at about 100° C. was also collected and characterized by FT-IR. The observation of C=O asymmetric stretching and the isolated N—H stretching confirms the reaction of only one amino group of 1,2-diaminobenzene and the absence of the formation of the imidazole ring of benzimidazole at about 100° C. More importantly, the C=N stretching at 1630 $cm^{-1}$, which distinguishes PSf-BIm from CPSf, increase as the DC in the starting CPSf increases. These spectral data confirm the formation of benzimidazole side groups on polysulfone.

Figure 3:
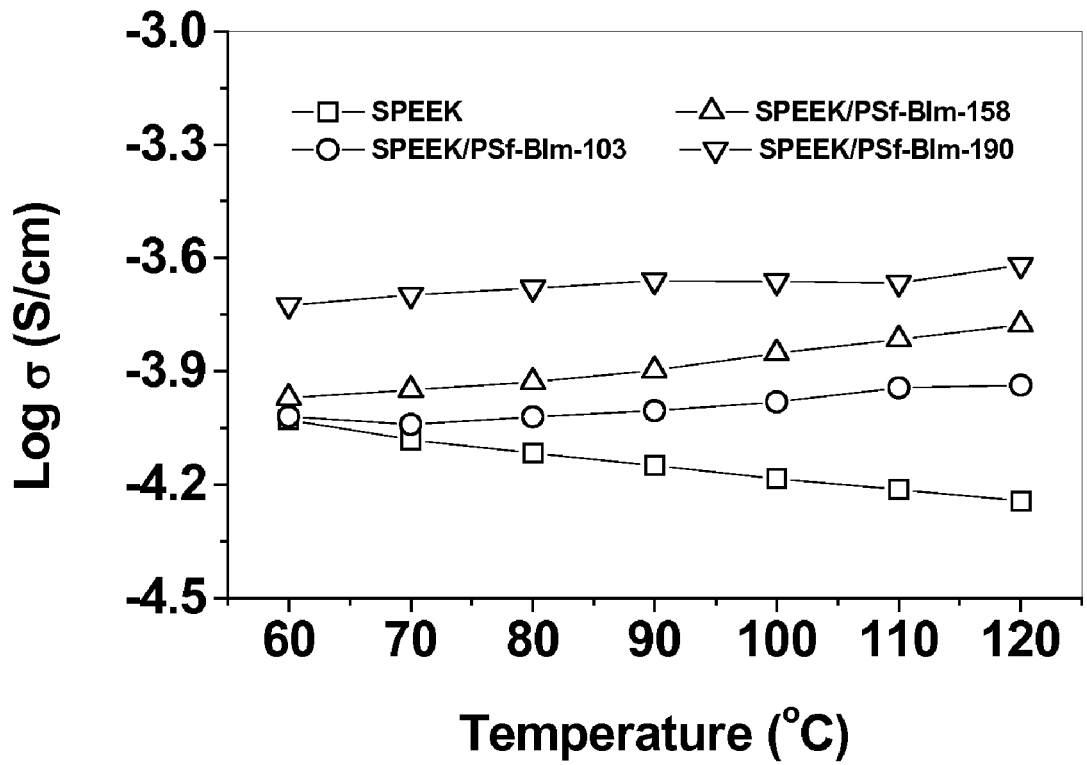
FIG. 3 is a graph comparing the proton conductivities of SPEEK and the blend membranes obtained with SPEEK and PSf-BIm under anhydrous condition.

FIG. 3 is a graph comparing the proton conductivities of SPEEK and the blend membranes obtained with SPEEK and PSf-BIm (3:1 weight ratio) under anhydrous condition. While the proton conductivity of SPEEK decreases with increasing temperature as the proton conduction becomes difficult at high temperatures in such acid-based polymers, the conductivity of the SPEEK/PSf-BIm blend membranes increase with increasing temperature due to the presence of benzimidazole tethered onto polysulfone. The pendant benzimidazole could act as a 'bridge' to promote proton conduction between sulfonic acid groups under low relative humidity conditions. Also, the proton conductivity increases as the DC of polysulfone to which benzimidazole is tethered increases, confirming the role played by benzimidazole on proton conduction.

Figure 4:
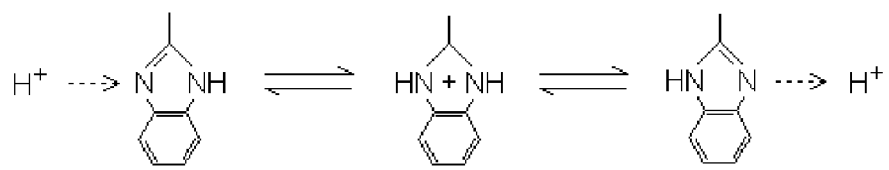
FIG. 4 is a diagram that illustrates a proton transfer mechanism for the pendant benzimidazole.

FIG. 4 is a diagram that illustrates a proton transfer mechanism for the pendant benzimidazole, which is analogous to the Grotthuss-type mechanism proposed for the complexes of the PBI system (17, 37). The sulfonic acid group of SPEEK can protonate the nitrogen site of benzimidazole, facilitating the hopping of the proton bound to the other nitrogen of the benzimidazole unit to another basic site of the benzimidazole unit or to the oxygen of another sulfonate anion group. The interaction between the sulfonic acid group and the nitrogen of the pendant benzimidazole group was confirmed by FTIR. A shift of the strong band at 1016 cm$^{-1}$, which is attributed to the symmetric stretching of the sulfonate S—O group of SPEEK, occurs with increasing PSf-BIm content in the polymer blends. Proton conduction in the blend membrane may occur by a mixed mechanism (a partial vehicle type mechanism in the domain of sulfonic acid groups and a partial Grotthuss-type mechanism in the domain of benzimidazole groups). The presence of benzimidazole group thus promotes proton conduction under anhydrous condition at higher temperatures. Another advantage of pendant benzimidazole group is the ease of swaying, which could promote long-range proton motion in the polymer system.

Figure 5:
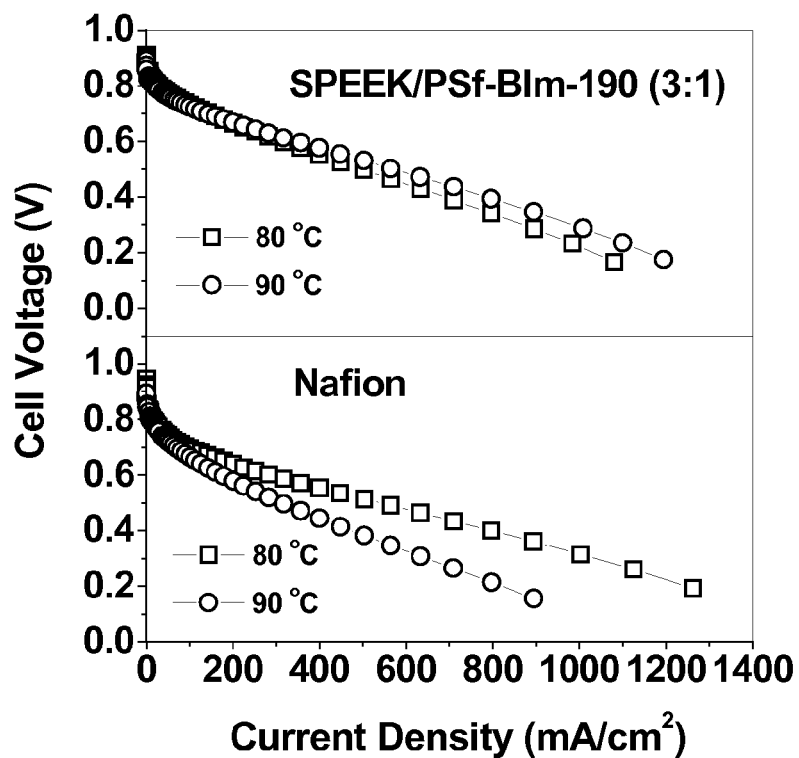
FIG. 5 is a graph that compares the performances of the SPEEK/PSf-BIm-190 blend membrane with NAFION® membrane in single cell PEMFC at different temperatures.

FIG. 5 is a graph that compares the performances of the SPEEK/PSf-BIm-190 (3:1 weight ratio) blend membrane in single cell PEMFC at different temperatures with those of NAFION®. In the case of the SPEEK/PSf-BIm-190 blend membrane, the polarization loss decreases as the temperature increases from about 80 to about 90° C. as one would expect due to the increasing proton conductivity as seen in FIG. 3, which is in contrast to the increase in polarization loss found with the NAFION® membrane due to the decrease in water content. Squares refer to $T_{cell}$=80° C. and $T_{H2}$=$T_{O2}$=80° C. and circles refer to $T_{cell}$=90° C. and $T_{H2}$=$T_{O2}$=80° C.

Figure 6:
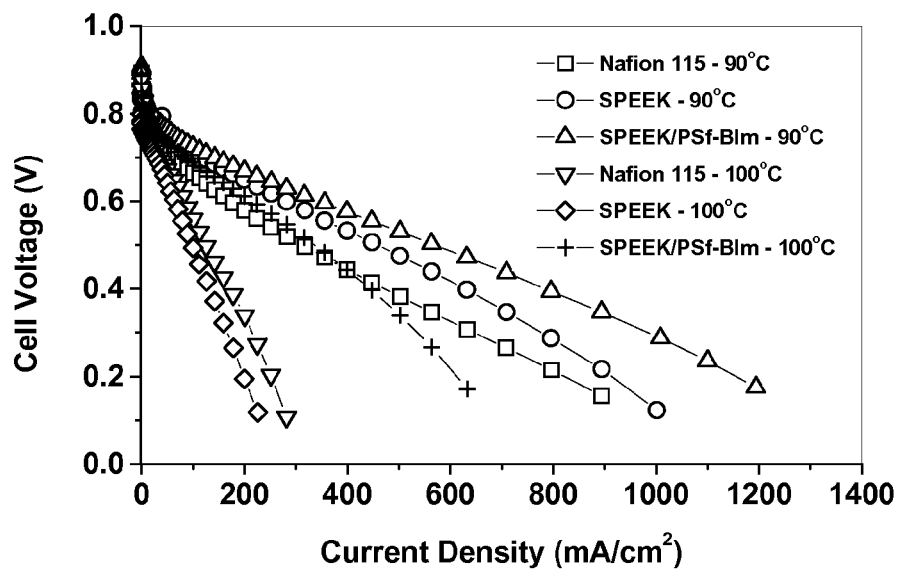
FIG. 6 is a graph that compares the performances of NAFION® 115, SPEEK, and SPEEK/PSf-BIm-190 membranes in single cell PEMFC.

FIG. 6 is a graph that compares the performances of NAFION® 115, SPEEK, and SPEEK/PSf-BIm-190 membranes in single cell PEMFC: $T_{H2}$=$T_{O2}$=80° C. and $T_{cell}$=90° C. or 100° C. The thicknesses of all the three membranes were kept the same and the electrodes were also fabricated in the same manner for all the three MEAs to have a good comparison of the intrinsic properties of the three membranes. The SPEEK/PSf-BIm-190 blend membrane exhibits better performance with lower polarization loss than both the NAFION® and SPEEK membranes at about 90° C. or about 100° C. The data demonstrate that the benzimidazole group present in PSf-BIm promotes proton conduction at higher temperatures. The decline in performance on going from about 90 to about 100° C. is due to the use of NAFION® in the electrodes (cathode and anode). Additionally, the decline in performance on going from about 90 to about 100° C. is drastic in the cases of SPEEK and NAFION® membranes compared to that in the case of the SPEEK/PSf-BIm-190 blend membrane. This is due to a significant decrease in the proton conductivity at about 100° C. with the SPEEK and NAFION® membranes, arising from a loss of the proton conducting solvent, water.

Figure 7:
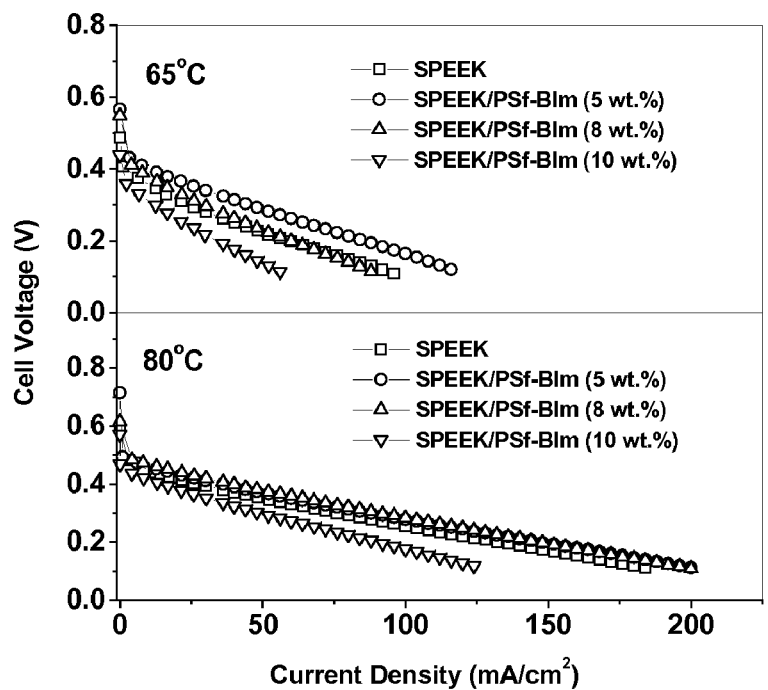
FIG. 7 is a graph comparing the polarization curves of the SPEEK/PSf-BIm blend membranes with that of SPEEK in DMFC with a methanol concentration of 1 M.
Figure 8:
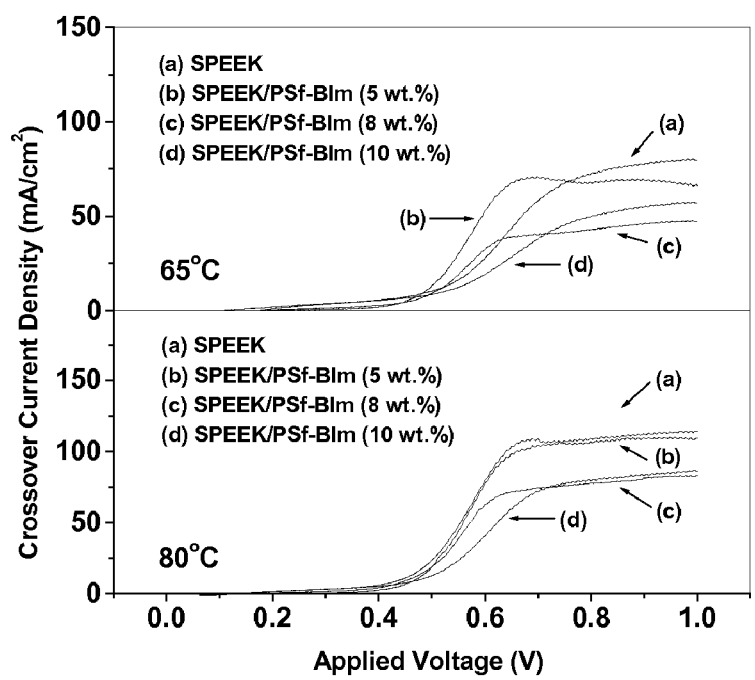
FIG. 8 is a graph comparing the methanol crossover current densities (with a methanol concentration of 1 M) of the SPEEK/PSf-BIm blend membranes with that of SPEEK.

FIG. 7 is a graph comparing the polarization curves of the SPEEK/PSf-BIm blend membranes with that of SPEEK in DMFC. The data were collected with a methanol flow rate of 2.5 mL/min at the anode and an $O_2$ flow rate of 200 mL/min with a pressure of 20 psi at the cathode. The humidifier temperature for $O_2$ was same as the cell temperature. Anode: 0.6 mg PtRu/cm$^2$, cathode: 1.0 mg Pt/cm$^2$, methanol concentration: 1 M. FIG. 8 is a graph comparing the methanol crossover current densities of the SPEEK/PSf-BIm blend membranes with that of SPEEK. The methanol concentration was 1 M. Although the thickness of SPEEK/PSf-BIm membranes is same to that of SPEEK, the methanol crossover limiting current densities of the SPEEK/PSf-BIm blend membranes with 8 and 10 wt. % PSf-BIm are 70% of that found with the plain SPEEK membrane, indicating much lower methanol permeability.

Figure 9:
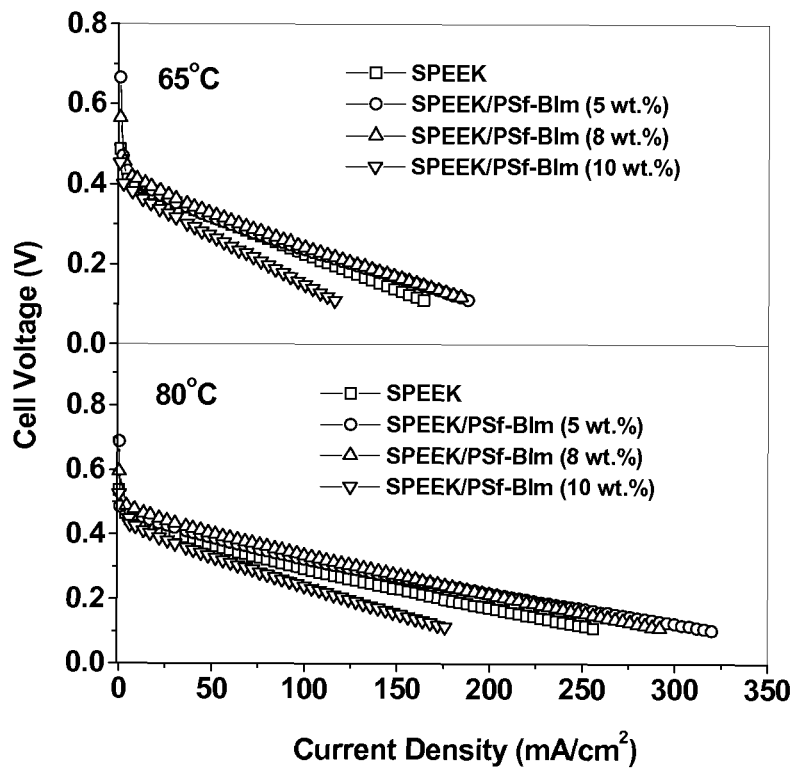
FIG. 9 is a graph comparing the polarization curves of the SPEEK/PSf-BIm blend membrane with that of SPEEK in DMFC with a methanol concentration of 2 M.
Figure 10:
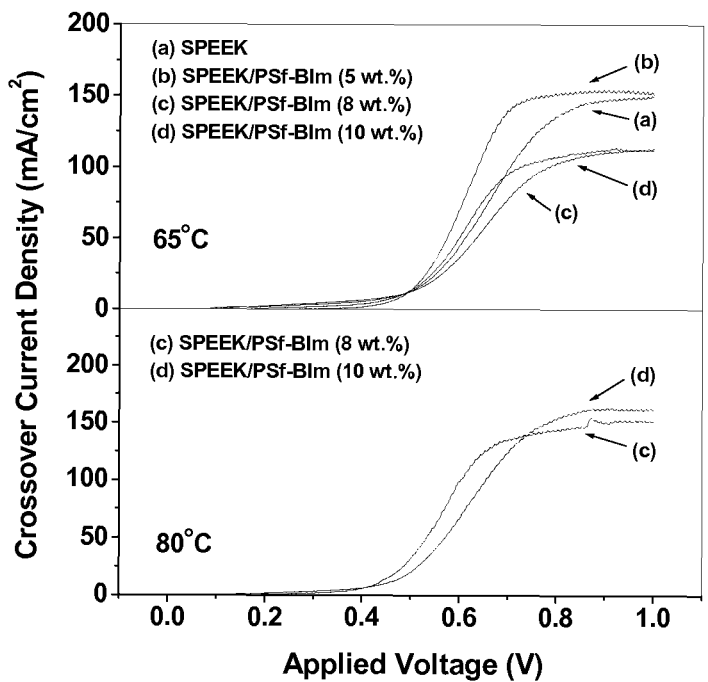
FIG. 10 is a graph comparing the methanol crossover current densities (with a methanol concentration of 2 M) of the SPEEK/PSf-BIm blend membranes with that of SPEEK.

FIG. 9 is a graph comparing the polarization curves of the SPEEK/PSf-BIm membrane with that of SPEEK in DMFC. The conditions were same excepting the methanol concentration was 2 M. FIG. 10 is a graph comparing the methanol crossover current densities of the SPEEK/PSf-BIm blend membranes with that of SPEEK. The methanol concentration was 2 M. With the same membrane thickness, the methanol crossover limiting current densities of the SPEEK/PSf-BIm blend membranes with 8 and 10 wt. % PSf-BIm are 70% of that found with the plain SPEEK membrane, indicating much lower methanol permeability. Another example of the present invention includes a novel N-heterocycle unit (amino-benzimidazole) with three nitrogen atoms, which could greatly promote proton conduction in the presence of a sulfonic acid polymer.

Figure 11:
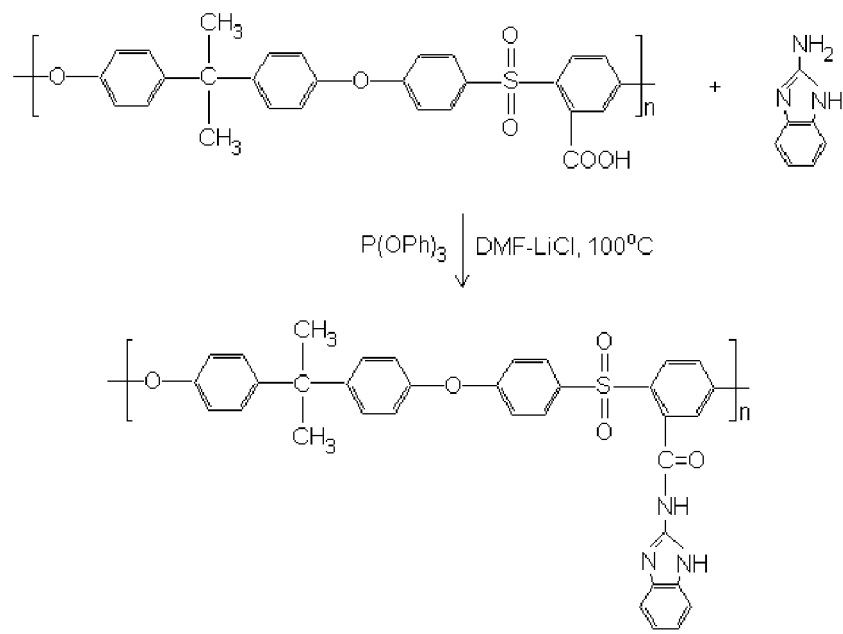
FIG. 11 is a schematic of the synthesis of polysulfone-2-amide-benzimidazole by a reaction between carboxylated polysulfone and 2-amino-benzimidazole (2-ABIm) using triphenylphosphite (TPP) as a dehydration agent.

FIG. 11 is a schematic of the synthesis of polysulfone-2-amide-benzimidazole (PSf-ABIm) by a reaction between carboxylated polysulfone (CPSf) and 2-amino-benzimidazole (2-ABIm) using triphenylphosphite (TPP) as a dehydration agent. The reaction between the carboxylic acid group and the 2-amino-benzimidazole was carried out at 100° C. for 3 hour to form the amide unit. Lithium chloride was used to enhance the dissolution of the reactants and product in dimethylformamide (DMF). The carboxylated polysulfones had a degree of carboxylation (DC) of 1.03, 1.58, and 1.90.

Figure 12:
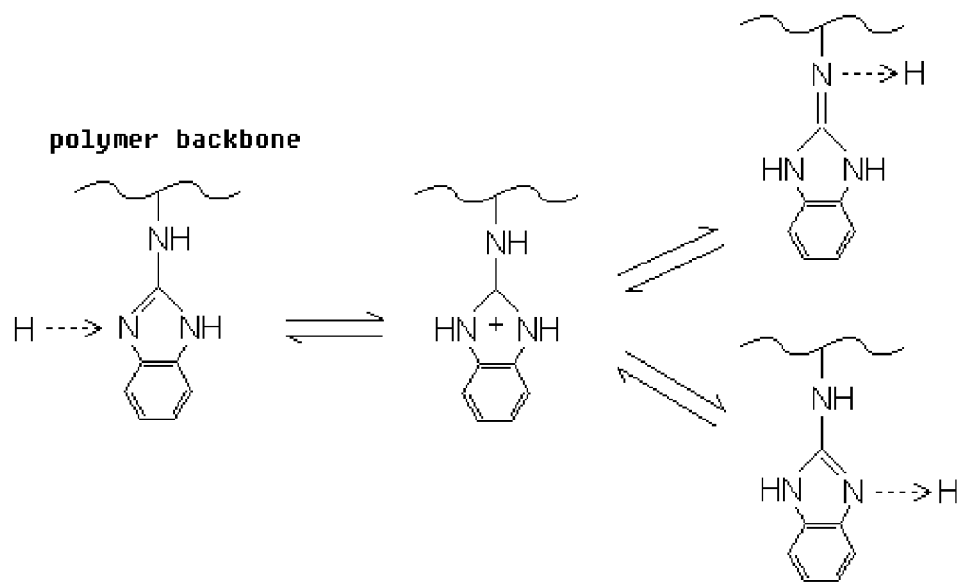
FIG. 12 is a schematic illustrating the three nitrogen atoms of the amino-benzimidazole unit act equally as proton donors or acceptors.

The three nitrogen atoms of the amino-benzimidazole unit act equally as proton donors or acceptors as shown in the diagram in FIG. 12, increasing the probability of proton transfer compared to one nitrogen atom of the pyridine- and two nitrogen atoms of the imidazole- or benzimidazole-doped systems (14).

In another embodiment carboxylated polysulfone with a degree of carboxylation (DC) of 1.03, 1.58, and 1.90 were used, but the data with a DC of 1.90 are presented here. The thicknesses of the SPEEK and SPEEK/PSf-ABIm blend membranes were held constant at about 50 μm, which is same as that of the NAFION® 112 membrane. The electrochemical evaluation in DMFC was carried out with a commercial catalyst of 40 wt % Pt—Ru (1:1) in Vulcan carbon (E-TEK) with a metal loading of 0.6 mg/cm$^2$ as the anode and a commercial 20 wt % Pt in Vulcan carbon (Alfa Aesar) with a metal loading of 1.0 mg/cm$^2$ as the cathode. The impregnated NAFION® loading in both the anode and cathode was 0.35 mg/cm$^2$.

The PSf-ABIm polymer was characterized by FT-IR and thermogravimetric analysis (TGA). FT-IR spectra were recorded with a Nicolet FT-IR instrument in the range of 4000 to 400 cm$^{-1}$ under $N_2$ atmosphere. TGA data were collected with a Perkin Elmer Series 7 Thermal Analysis System in flowing air from room temperature to 600° C. at a heating rate of 5° C./min.

Figure 13:
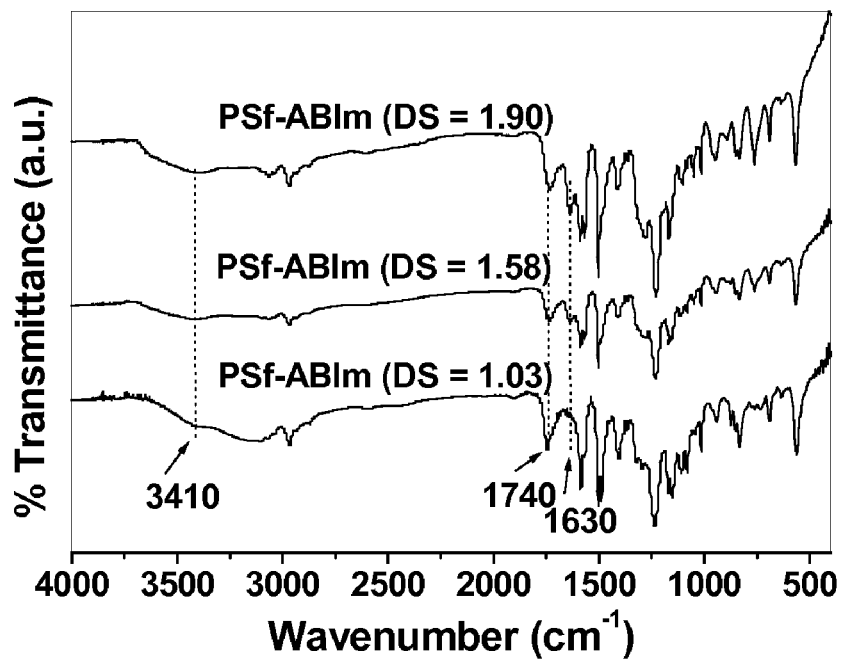
FIG. 13 illustrates the FT-IR spectra of PSf-ABIm polymer.

FIG. 13 illustrates the FT-IR spectra of PSf-ABIm polymer with various degrees of carboxylation. The main absorption bands of PSf-ABIm indicating the presence of benzimidazole are closely similar to those of PBI or poly(2,5-benzimidazole) (ABPBI). The bands around 3400 cm$^{-1}$ in PSf-ABIm are attributed to the isolated N—H stretching. The strong absorption at 1740 cm$^{-1}$ is due to the asymmetric C=O stretching in PSf-ABIm. More importantly, the C=N stretching at 1630 cm$^{-1}$, which indicates the tethering of benzimidazole, increases as the degree of carboxylation increases. These spectral data confirm the formation of amide-benzimidazole side groups on polysulfone.

Figure 14:
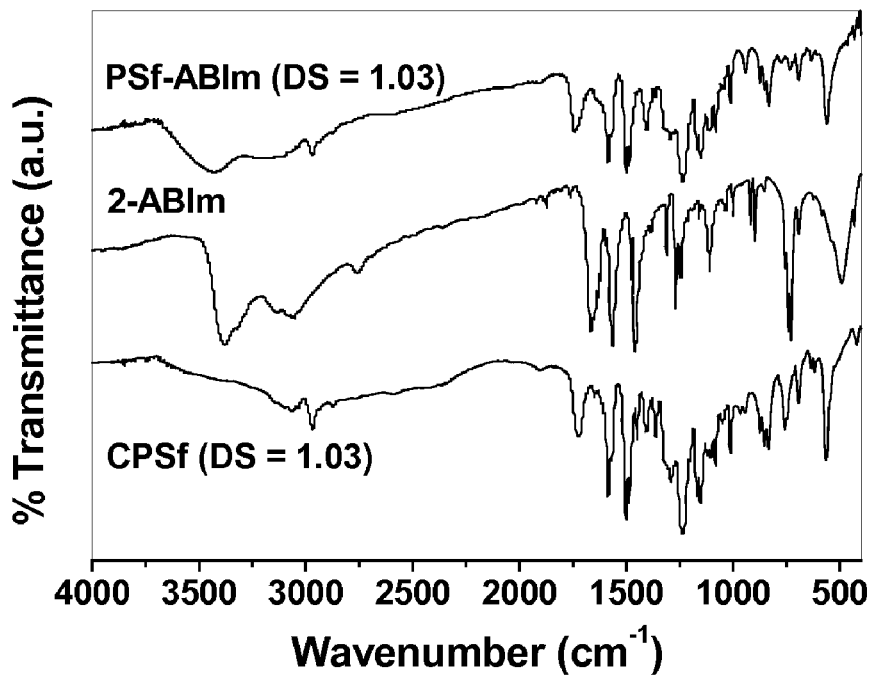
FIG. 14 illustrates the FT-IR spectra of carboxylated polysulfone (CPSf), 2-aminobenzimidazole (2-ABIm), and polysulfone-2-amide-benzimidazole (PSf-ABIm)
Figure 15:
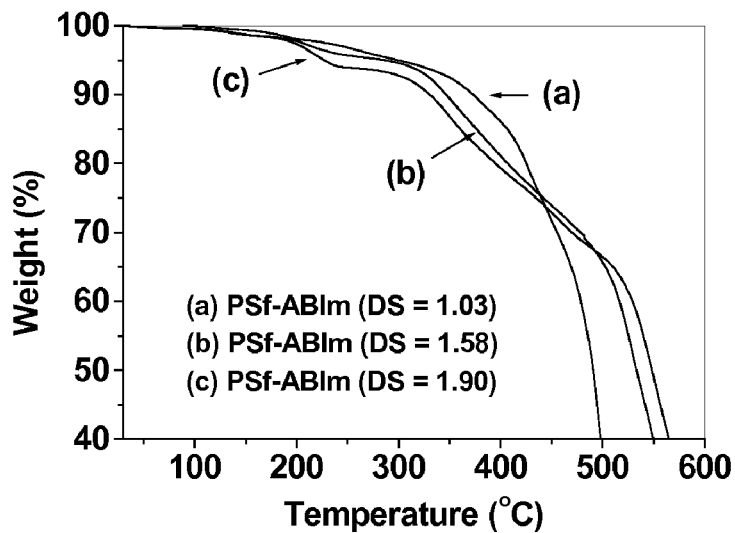
FIG. 15 is a thermogravimetric analysis plot that compares PSf-ABIm with various degree of carboxylation.

FIG. 14 illustrates the FT-IR spectra of carboxylated polysulfone (CPSf), 2-aminobenzimidazole (2-ABIm), and polysulfone-2-amide-benzimidazole (PSf-ABIm). The bands at 1630 and 3410 in PSf-ABIm indicate the formation of amide-benzimidazole on polysulfone. FIG. 15 is a thermogravimetric analysis plot that compares PSf-ABIm with various degree of carboxylation. The minimal weight loss below 120° C. indicating its thermal stability for fuel cell use.

The percent liquid uptake by the polymers was obtained from the weight change before and after equilibrating the dry membrane in de-ionized water or methanol solution at 65° C. and 80° C., and the data are shown in Table 1. The blend membranes exhibit much lower liquid uptake compared to NAFION®. Table 1 compares the liquid uptake of SPEEK/PSf-ABIm blend membranes, SPEEK, and NAFION® in methanol solution at different temperatures.

TABLE 1

| Membrane | Methanol Concentration (M) | Liquid uptake (wt. %) | |
|---|---|---|---|
| | | 65° C. | 80° C. |
| SPEEK | 0 | 11.6 | 20.6 |
| | 1 | 15.7 | 22.4 |
| | 2 | 24.5 | 28.9 |
| SPEEK/PSf-ABIm (3 wt % PSf-ABIm) | 0 | 10.9 | 19.8 |
| | 1 | 15.3 | 21.4 |
| | 2 | 23.5 | 27.3 |
| SPEEK/PSf-ABIm (5 wt % PSf-ABIm) | 0 | 10.2 | 18.2 |
| | 1 | 15.0 | 20.4 |
| | 2 | 22.8 | 25.9 |
| SPEEK/PSf-ABIm (8 wt % PSf-ABIm) | 0 | 9.5 | 17.5 |
| | 1 | 14.1 | 16.1 |
| | 2 | 21.6 | 24.3 |
| SPEEK/PSf-ABIm (10 wt % PSf-ABIm) | 0 | 8.6 | 15.4 |
| | 1 | 13.4 | 14.9 |
| | 2 | 20.0 | 23.1 |
| NAFION ® 115 | 0 | 24.0 | 26.6 |
| | 1 | 29.1 | 30.2 |
| | 2 | 32.2 | 33.7 |

The membrane-electrode assemblies (MEAs) were fabricated by uniaxially hot-pressing the anode and cathode onto a membrane at 140° C. for 3 minute. The electrochemical performances in DMFC of the MEAs were evaluated with a single-cell fixture having an active area of 5 cm$^2$ and feeding a preheated methanol solution into the anode at a flow rate of 2.5 mL/min by a peristaltic pump without back pressurization and humidified oxygen into the cathode at a flow rate of 200 mL/min with a back pressure of 20 psi. The temperatures of preheated methanol solution and humidified oxygen were same as that of the cell (65° C. or 80° C.).

Figure 16:
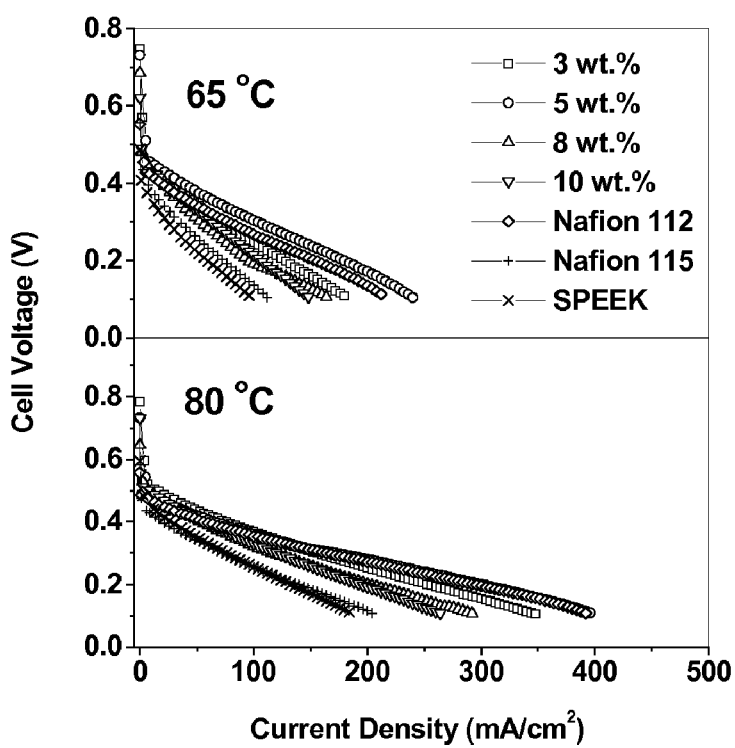
FIG. 16 is a plot of cell voltage versus current density to compare the fuel cell performance data of SPEEK, NAFION® 112, NAFION®115, and SPEEK/PSf-ABIm blend membrane in DMFC with a methanol concentration of 1 M.

FIG. 16 is a plot of cell voltage versus current density to compare the fuel cell performance data of SPEEK, NAFION® 112, NAFION® 115, and SPEEK/PSf-ABIm blend membrane collected at 65° C. and 80° C. with 1 M methanol solution. Methanol crossover was evaluated by a voltammetric method in which methanol solution was fed at a flow rate of 2.5 mL/min into the anode side of MEA while the cathode side was kept in an inert humidified N$_2$ atmosphere. By applying a positive potential at the cathode side, the flux rate of permeating methanol was determined by measuring the steady-state limiting current density resulting from complete electro-oxidation at the membrane/Pt catalyst interface at the cathode side.

Figure 17:
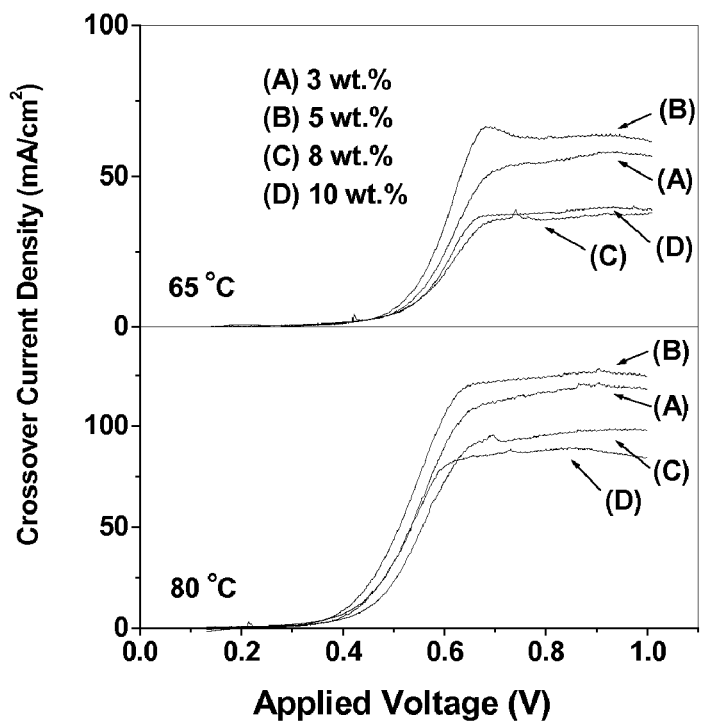
FIG. 17 is a graph comparing the methanol crossover current densities (with a methanol concentration of 1 M) of the SPEEK/PSf-ABIm membranes with 3, 5, 8 and 10 weight percent of PSf-ABIm.

FIG. 17 is a graph comparing the methanol crossover current densities of the SPEEK/PSf-ABIm membranes with 3, 5, 8 and 10 weight percent of PSf-ABIm in DMFC at 65° C. and 80° C. The methanol concentration was 1 M. Blend membranes with 8 and 10 weight percent show even much lower methanol crossover than those with 3 and 5 weight percent, indicating the ability of PSf-ABIm to block methanol crossover.

Figure 18:
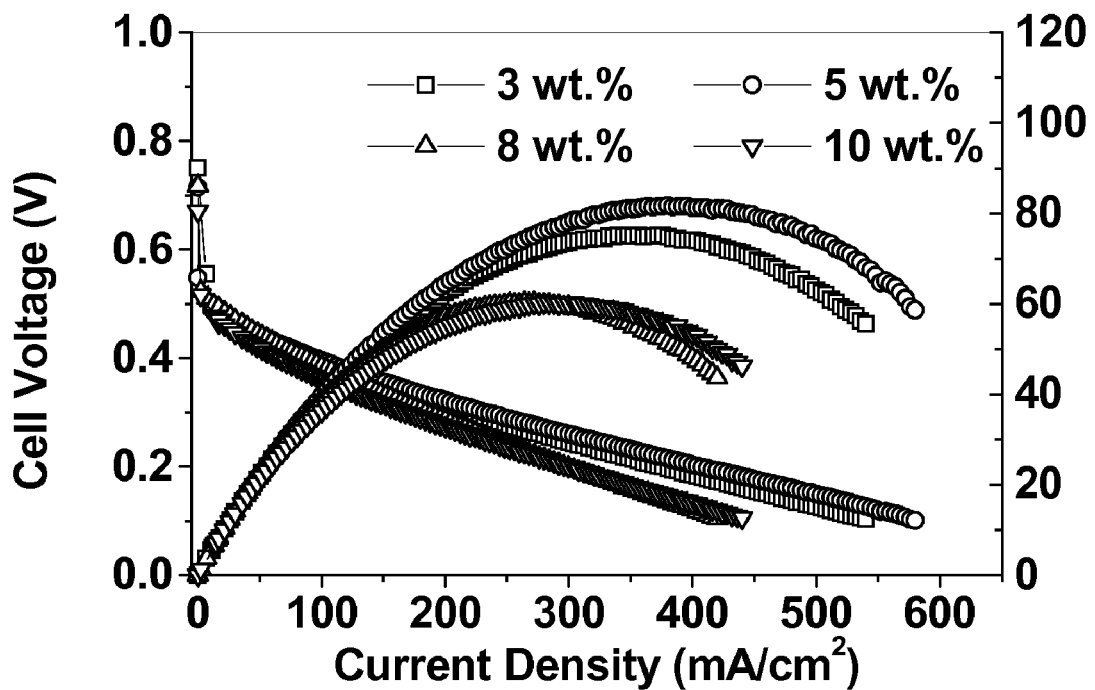
FIG. 18 is a plot of the polarization curves of the SPEEK/PSf-ABIm blend membranes with 3, 5, 8 and 10 weight percent PSf-ABIm in DMFC with a methanol concentration of 2 M.
Figure 19:
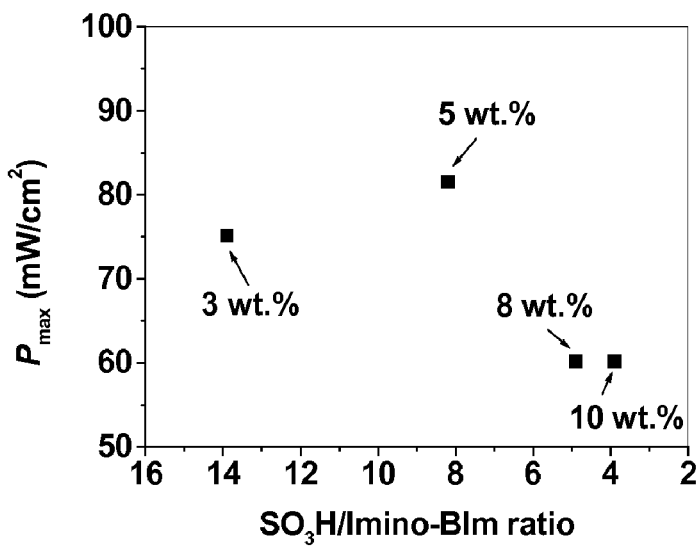
FIG. 19 is a plot of the variation of the maximum power density of the blend membranes in DMFC with sulfonic acid group to the amino-benzimidazole ratio.

FIG. 18 is a plot of the polarization curves of the SPEEK/PSf-ABIm blend membranes with 3, 5, 8 and 10 weight percent PSf-ABIm in DMFC at 80° C., and FIG. 19 is a plot of the variation of the maximum power density of the blend membranes with sulfonic acid group to the amino-benzimidazole ratio. The methanol concentration was 2 M. The fuel cell performance and power density increases initially with increasing PSf-ABIm content, reaches a maximum at 5 weight percent PSf-ABIm, and then decreases.

Figure 20:
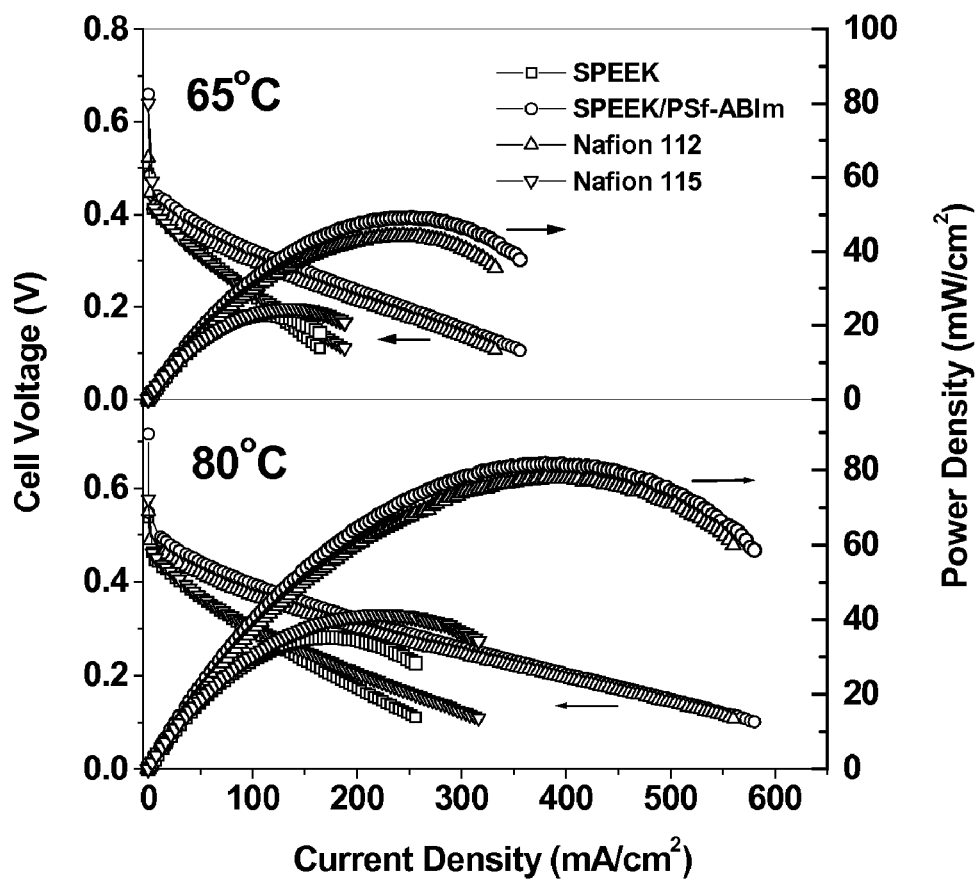
FIG. 20 is a graph comparing the electrochemical performance data of the SPEEK/PSf-ABIm blend membranes with those of SPEEK and NAFION® membranes in DMFC.

FIG. 20 is a graph of the cell voltages versus the current density to compare the electrochemical performance data of the SPEEK/PSf-ABIm blend membranes with those of SPEEK and NAFION® membranes in DMFC at 65° C. and 80° C., collected with 2 M methanol solution. The plain SPEEK membrane exhibits higher polarization loss and lower power density compared to both the NAFION® 112 and NAFION® 115 membranes due to low proton conductivity (3). NAFION® 112 shows better performance than NAFION® 115 because it is thinner. The SPEEK/PSf-ABIm blend membrane with 5 weight percent of PSf-ABIm shows performance much better than those of NAFION® 115 and plain SPEEK and similar to or slightly better than that of NAFION® 112 at 65° C. and 80° C. Also, the blend membrane exhibits higher open cell voltage (e.g., about 0.659 V and about 0.715 V) than all the other three membranes (e.g., about 0.488 V to about 0.639 V), indicating lower methanol crossover. The better performance of the SPEEK/PSf-ABIm blend membrane compared to that of the plain SPEEK and NAFION® membranes could be attributed, respectively, to the better promotion of proton conduction and lower methanol crossover (see below). Furthermore, while it is difficult to get fuel cell performance data with membranes containing imidazole due to the poisoning of the Pt catalyst by imidazole (20), the tethering of N-heterocycles like amino-benzimidazole to a polymer backbone prevents such a poisoning.

Figure 21:
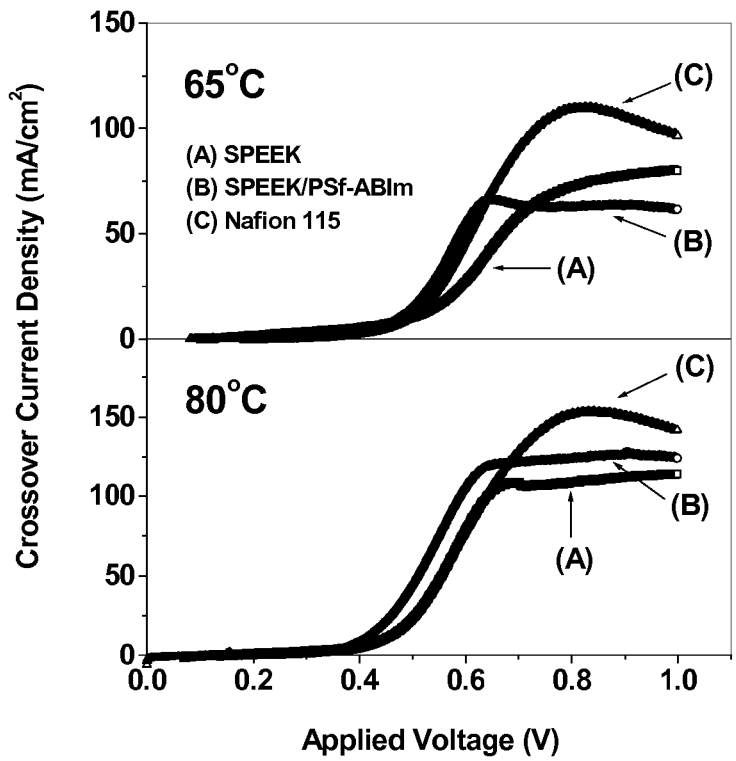
FIG. 21 is a graph of the methanol crossover current density for the membranes.

FIG. 21 is a graph of the methanol crossover current density for the membranes, which was measured by a procedure described elsewhere (38). The crossover current density for the PSf-ABIm blend membrane is much lower than that found with NAFION® 115 and slightly lower than or close to that found with the plain SPEEK membrane. This is consistent with the literature data that SPEEK exhibits lower methanol permeability than NAFION® 115 (3). The crossover current density for NAFION® 112 is not shown. The lower methanol crossover observed with the SPEEK/PSf-ABIm blend membrane compared to that with the NAFION® membrane could be attributed to the narrower pathways for methanol/water permeation in the former. It has been found that the separation between the hydrophobic and hydrophilic groups in SPEEK is smaller compared to that in NAFION®, resulting in a stronger confinement of water/methanol in the narrow channels and significantly lower water/methanol permeation (39-41). The amino-benzimidazole side groups tethered to polysulfone and their interaction with the hydrophilic groups of SPEEK helps to reduce the methanol crossover further.

Figure 22:
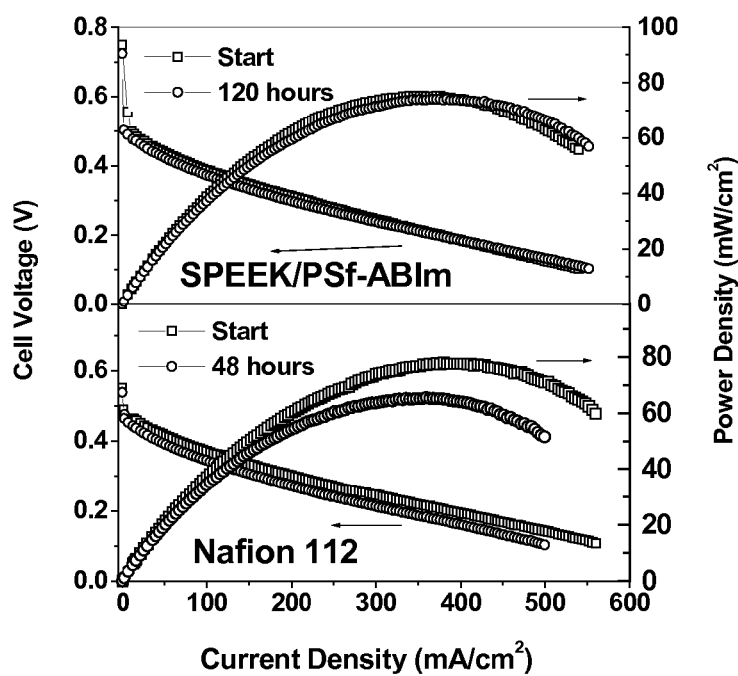
FIG. 22 is a graph that compares the fuel cell performance data of the SPEEK/PSf-ABIm blend membrane with NAFION® membrane as a function of time in DMFC.

FIG. 22 is a graph that compares the fuel cell performance data of the SPEEK/PSf-ABIm blend membrane with 3 weight percent PSf-ABIm before and after 120 hours of operation and NAFION® 112 membrane before and after 48 hours of operation. It took two days for the fuel cell performance (voltage) to become stable with time, and the time was counted after this initial stabilization period. While a significant decline in performance is found with the NAFION® 112 membrane in 48 h, little or no decline in performance is found after 120 hour with the PSf-ABIm blend membrane due to suppressed methanol crossover. Although the initial performances of NAFION® 112 is similar to that of the PSf-ABIm blend membrane, a higher methanol crossover in the case of NAFION® 112 leads to a poisoning of the cathode Pt catalyst and a consequent degradation in the cell performance with time. For this reason, NAFION® 115 rather than NAFION® 112 is generally used in DMFC, but NAFION® 115 shows much lower performance than the PSf-ABIm blend membrane. The superior performance of the blend membrane with lower methanol crossover compared to that of NAFION® 115 could also enable DMFC with a lower Pt catalyst loading at the cathode, offering additional cost savings.

The present invention provides a polymeric membrane material based on N-heterocycle unit (e.g., benzimidazole or amino-benzimidazole). Blend membranes including polysulfone-2-amide-benzimidazole and/or polysulfone-benzimidazole (basic polymer) and sulfonated poly(ether ether ketone) (acid polymer) demonstrate a viable strategy to facilitate proton conduction through acid-base interactions and suppress methanol crossover, while preserving good mechanical and chemical stabilities. The blend membrane exhibits superior, long term performance in DMFC with little or no decline with time due to a significant reduction in methanol permeability compared to that with NAFION®. These membranes based on acidic and basic polymer blends offer a promising strategy to replace lithium ion batteries in portable electronic devices like laptop computers and cell phones with direct methanol fuel cells. Although the concept is demonstrated here with polysulfone and SPEEK, the strategy could be applied with a wide variety and combination of other aromatic polymers. These membranes involving acid-base interactions also offer the possibility of exhibiting high proton conductivity and good performance in proton exchange membrane fuel cells (PEMFC) at higher temperatures (e.g., greater than about 100° C.) and low relative humidity.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCE

1. A. Heinzel, V. M. Barragan, J. Power Sources 84, 70 (1999).
2. S. Wasmus, A. Kuver, J. Electroanal. Chem. 461, 14 (1999).
3. B. Yang, A. Manthiram, Electrochem. and Solid-State Lett. 6, A229 (2003).
4. F. Q. Liu, G. Q. Lu, C. Y. Wang, J. Electrochem. Soc. 153, A543 (2006).
5. Q. F. Li, R. H. He, J. A. Gao, J. O. Jensen, N. J. Bjerrum, J. Electrochem. Soc. 150 (2003) A1599.
6. N. Asano, K. Miyatake, M. Watanabe, J. Polym. Sci Part A: Polym. Chem. 44, 2744 (2006).
7. Y. Yin, O. Yamada, K. Tanaka, K. Okamoto, Polym. J. 38, 197 (2006).
8. F. Lufrano, G. Squadrito, A. Patti, E. Passalacqua, J. Appl. Polym. Sci. 77, 1250 (2000).
9. T. Kobayashi, M. Rikukawa, K. Sanui, N. Ogata, Solid State Ionics 106, 219 (1998).
10. Y.-Z. Fu, A. Manthiram, J. Power Sources, 157, 222 (2006).
11. R. Nolte, K. Ledjeff, M. Bauer and R. Mulhaupt, J. Membr. Sci. 83, 211 (1993).
12. J. A. Kerres, J. Membr. Sci. 185, 3 (2001).

13. J. A. Kerres, Fuel Cells 5, 230 (2005).
14. J. S. Wainright, J. T. Wang, D. Weng, R. F. Savinell, M. Litt, J. Electrochem. Soc. 9 (1995) 3045.
15. K. D. Kreuer, S. J. Paddison, E. Spohr, and M. Schuster, Chem. Rev. 104 (2004) 4637.
16. X. Glipa, B. Bonnet, B. Mula, D. J. Jones, J. J. Rozière, Mater. Chem. 9 (1999) 3045.
17. R. Bouchet, E. Siebert, Solid State Ionics 118 (1999) 287.
18. K. D. Kreuer, A. Fuchs, M. Ise, M. Spaeth and J. Maier, Electrochim. Acta 43 (1998) 1281.
19. J. Sun, L. R. Jordan, M. Forsyth, D. R. MacFarlane, Electrochim. Acta 46 (2001) 1703.
20. C. Yang, P. Costamagna, S. Srinivasan, J. Benziger, A. B. Bocarsly, J. Power Sources 103 (2001) 1.
21. A. Bozkurt, W. H. Meyer, G. Wegner, J. Power Sources 123 (2003) 126.
22. M. Yamada, I. Honma, Polymer 46 (2005) 2986.
23. W. Munch, K. D. Kreuer, W. Silvestri, J. Maier, G. Seifert, Solid State Ionics 145 (2001) 437.
24. M. Schuster, W. H. Meyer, G. Wegner, H. G. Herz, M. Ise, M. Schuster, K. D. Kreuer, J. Maier, Solid State Ionics 145 (2001) 85.
25. H. G. Herz, K. D. Kreuer, J. Maier, G. Scharfenberger, M. F. H. Schuster, W. H. Meyer, Electrochim. Acta 48 (2003) 2165.
26. M. Yamada and I. Honma, J. Phys. Chem. B 108 (2004) 5522.
27. M. F. H. Schuster, W. H. Meyer, M. Schuster, and K. D. Kreuer, Chem. Mater. 16 (2004) 329.
28. A. Bozkurt, W. H. Meyer, Solid State Ionics 138 (2001) 259.
29. Z. Zhou, S. Li, Y. Zhang, M. Liu, and W. Li, J. Am. Chem. Soc. 127 (2005) 10824.
30. H. Pu, L. Qiao, Macromol. Chem. Phys. 206 (2005) 263.
31. J. C. Persson and P. Jannasch, Macromolecules 38 (2005) 3283.
32. P. Jannasch, Current Opinion in Colloid and Interface Science 8 (2003) 96.
33. M. D. Guiver, S. Croteau, J. D. Hazlett & O. Kutowy, Br. Polymer J. 23 (1990) 29.
34. B. Yang and A. Manthiram, Electrochem. Solid-State Lett. 6 (2003) A229.
35. L. Xiong, A. M. Kannan, and A. Manthiram, Electrochem. Commun. 4 (2002) 898.
36. J. A. Asensio, S. Borrós, and P. Gómez-Romero, J. Electrochem. Soc. 151 (2004) A304.
37. R. Bouchet, S. Miller, M. Duclot and J. L. Souquet, Solid State Tonics 145 (2001) 69.
38. X. Ren, T. E. Springer, T. A. Zawodzinski, and S. Gottesfeld, J. Electrochem. Soc. 147, 466 (2000).
39. K. D. Kreuer, J. Membr. Sci. 185, 29 (2001).
40. K. D. Kreuer, Solid State Ionics, 97, 1 (1997).
41. B. Yang and A. Manthiram, J. Power Sources, 153, 29 (2006).

What is claimed is:

1. An acid-base polymer membrane comprising:
an acidic polymer comprising a sulfonated poly(ether ether ketone) mixed with
a basic polymer comprising
a poly(sulfone) polymer and one or more benzimidazole groups tethered to the poly(sulfone) polymer to form an acid-base polymer membrane, wherein the acid-base polymer membrane has high proton conductivity at low relative humidity, good thermal and mechanical stabilities, and low methanol permeability.

2. The composition of claim 1, wherein the one or more benzimidazole groups comprises one or more benzimidazole like group selected from a 2-amino-benzimidazole group, a perimidine group, triazole group, derivatives, mixtures and combinations thereof.

3. The composition of claim 1, further comprising one or more substitutions to the poly(sulfone) selected from a lower alkyl, alkoxy, alkoxyalkyl, hydroxy, hydroxyalkyl, alkenyl, amino, nitrate, alkylamino, dialkylamino, nitro, nitroso, aryl, alkylaryl, arylalkoxy, cycloalkyl, bridged cycloalkyl, cycloalkoxy, arylthio, alkylsulfinyl, carboxamido, carbamoyl, carboxyl, carbonyl, halogen, halo, haloalkyl, haloalkoxy, heteroayl, heterocyclic ring, arylheterocyclic ring, heterocyclic compounds, amido, alkylamido, carboxylic ester, carboxylic acid, phosphoryl or combination thereof.

4. The composition of claim 1, wherein the one or more benzimidazole groups are 2-amide-benzimidazole groups that form a polysulfone-2-amide-benzimidazole.

5. The composition of claim 1, wherein the acidic polymer and the basic polymer are blended.

6. The composition of claim 1, wherein the basic polymer has a degree of substitution of the one or more benzimidazole groups is between about 0.1 and about 4 per repeat unit.

7. A method of making a polymer membrane comprising the steps of:
mixing an acidic polymer comprising a sulfonated poly(ether ether ketone) with a basic polymer comprising a poly(sulfone) comprising a tethered benzimidazole side chain to form an acid-base polymer; and
forming the acid-base polymer into a membrane.

8. The method of claim 7, wherein the acidic polymer and the basic polymer are blended.

9. The method of claim 7, wherein the basic polymer has a degree of benzimidazole side chain substitution of between about 0.1 and about 4 per repeat unit.

10. The method of claim 7, wherein the benzimidazole side chain comprises one or more benzimidazole groups, aminobenzimidazole groups, or benzimidazole like groups selected from perimidine groups, triazole groups, and derivatives or mixtures and combinations thereof.

11. The method of claim 7, wherein the poly(sulfone) further comprises one or more substitutions selected from lower alkyl, alkoxy, alkoxyalkyl, hydroxy, hydroxyalkyl, alkenyl, amino, nitrate, alkylamino, dialkylamino, nitro, nitroso, aryl, alkylaryl, arylalkoxy, cycloalkyl, bridged cycloalkyl, cycloalkoxy, arylthio, alkylsulfinyl, carboxamido, carbamoyl, carboxyl, carbonyl, halogen, halo, haloalkyl, haloalkoxy, heteroayl "heterocyclic ring, arylheterocyclic ring, heterocyclic compounds, amido, alkylamido, carboxylic ester, carboxylic acid, phosphoryl or combination thereof.

12. A membrane-electrode assembly for use in a proton exchange membrane fuel cell comprising:
an anode;
a cathode in communication with the anode, and
a polymeric acid-base membrane in communication with the anode and the cathode, wherein the polymeric acid-base membrane comprises an acidic polymer comprising a poly(ether ether ketone) mixed with a basic polymer comprising at least one benzimidazole groups tethered to a poly(sulfone), wherein the polymeric acid-base membrane has high proton conductivity at low relative humidity, good thermal and mechanical stabilities, and low methanol permeability or crossover.

13. The composition of claim 12, wherein the anode, cathode, and polymeric acid-base membrane are combined by hot-pressing or any other suitable method.

14. An acid-base polymer membrane comprising:
an acidic polymer comprising a sulfonated poly(ether ether ketone) polymer mixed with a basic polymer comprising a poly(sulfone) polymer and one or more tethered benzimidazole groups attached to the poly(sulfone) polymer to form an acid-base polymer membrane, wherein the acid-base polymer membrane has a high proton conductivity at a low relative humidity, a good thermal and mechanical stabilities, and a low methanol permeability or crossover.

15. The method of claim 14, wherein the one or more tethered benzimidazole groups are selected from benzimidazole, 2-amide-benzimidazole groups, amino-benzimidazole groups, and benzimidazole like groups selected from perimidine groups, triazole groups, and derivatives, mixtures and combinations thereof.

16. A polymer electrolyte fuel cell comprising:
two or more electrodes positioned about a polymer electrolyte membrane, wherein the polymer electrolyte membrane comprises an acidic polymer comprising a sulfonated poly(ether ether ketone) mixed with a basic polymer comprising a poly(sulfone) polymer and one or more benzimidazole groups tethered to the poly(sulfone) polymer to form an acid-base polymer membrane, wherein the acid-base polymer membrane has a high proton conductivity at a low relative humidity, a good thermal and mechanical stabilities, and a low methanol permeability or crossover.

17. The polymer electrolyte fuel cell of claim 16, wherein the polymer electrolyte fuel cell is a proton exchange membrane fuel cell or a direct methanol fuel cell.

18. The polymer electrolyte fuel cell of claim 16, wherein the one or more benzimidazole groups are one or more benzimidazole like groups selected from 2-amide-benzimidazole groups, amino-benzimidazole groups, perimidine groups, triazole groups, or derivatives, mixtures and combinations thereof.

19. The claim of 1 wherein the membrane is used in a redox flow battery with low or little crossover of reactant chemicals.

* * * * *